INVENTOR.
Albert T. Fellows
BY John A. Crowley, Jr.
Attorney

United States Patent Office 3,228,849
Patented Jan. 11, 1966

3,228,849
UTILIZATION OF NUCLEAR FISSION FOR
CHEMICAL REACTIONS
Albert T. Fellows, Levittown, Pa., assignor to Socony
Mobil Oil Company, Inc., a corporation of New York
Filed Apr. 22, 1960, Ser. No. 24,124
16 Claims. (Cl. 176—39)

This application is a continuation-in-part of application Serial Number 849,754, filed in the United States Patent Office on October 30, 1959, now abandoned.

This invention is concerned with an improved method for utilizing kinetic energy of nuclear fission products for conduct of chemical reactions and transformations which can be made to progress only upon supply of substantial amounts of energy.

Prior art

It is known that many chemical reactions may be caused to occur by subjection of the reactants, either in the presence or absence of porous or catalytic solid materials, to irradiation by alpha particles, neutrons, beta rays or electromagnetic gamma radiations emitted by radioactive materials and as a result of nuclear fission reactions.

United States No. 2,905,607 discloses conversion of distillate hydrocarbons in the presence of particles of cracking catalysts such as alumina and silica-alumina having a surface area of 50 to 600 square meters per gram and a pore size of 20 to 150 angstroms at 0 to 700° F. under exposure to a neutron flux in the range of $10^{11}$ to $10^{15}$ n./cm.$^2$/second. The products are said to include gasoline of high isoparaffin content and high quality diesel fuels. United States Patent No. 2,905,606 discloses exposure of hydrocarbons boiling up to 1,150° F. in the presence of added hydrogen and a number of disclosed hydrogenation catalysts such as platinum on alumina to a neutron flux at a temperature in the range of 50 to 700° F. to effect both hydrogenation and conversion to lower boiling products.

It is known that the fission of fissionable materials, for example, uranium–235 ($U^{235}$), not only gives rise to energy in the form of certain forms of radiant energy and neutrons, but also to particles of large mass, possessed of energy in very considerable quantity. The energy in these particles of large mass is of the order of 80% of the total energy delivered by the fission of $U^{235}$. The possible utility of such energy may be exemplified, in a manner, by the following comparison. The energy necessary to break a hydrogen to carbon bond in methane is of the order of 4 electron volts. The energy, per fission, available in the total of the high mass fractions from the fission of a $U^{235}$ atom is of the order of 162 million electron volts.

It is known that these energies may be utilized for such purposes. Coekelbergs et al. ("Some Future Aspects of Radio-chemistry," Belgische Chemische Industrie, 22, No. 2, 153–64 (1957)) discuss both the utilization of the energy of radiant beta and gamma energy from wastes of the nuclear industry and also the utilization of the much greater recoil energy, which is communicated to fission fragments for the conduct of chemical reactions. A number of large G value exothermic and small G value endothermic radiochemical reactions are listed. These include oxidation of organic and inorganic compounds, for example, oxidation of benzene to phenol; polymerization and halogenation of hydrocarbons, for example, polymerization of ethylene; fixation of nitrogen; synthesis of ammonia; and rupture and transformation of organic and inorganic molecules, for example, transformation of methane to hydrogen and $C_2$ hydrocarbons, including acetylene, of acetylene to benzene and of water to hydrogen and oxygen.

Similarly, Harteck and Dondes have described experiments in which chemical reactants were placed in sealed vessels containing powdered, enriched $U^{235}$ and subjected in a nuclear reactor to thermal neutron flux of $10^{12}$ neutrons per square centimeter per second, where fission fragment ionization as well as other usual ionizing radiations, was utilized to cause chemical conversion of gaseous reactants to different chemical products. The conversions of $CO_2$ to CO and $O_2$ and of $N_2$ and $O_2$ to $NO_2$ and NO were particularly studied. It was shown, for example, that fission energy could produce up to $10.2 \times 10^6$ moles of $NO_2$ per mole of $U^{235}$ at 175 to 225° C. ("Producing Chemicals With Reactor Radiations," Harteck and Dondes, Nucleonics, volume 14, No. 7, 22–25, July 1956). These workers have also effected conversion of methane to hydrogen and ethane and of liquid and gaseous ammonia to nitrogen, hydrogen and small amounts of hydrazine by subjecting respectively methane and ammonia, sealed in silica vessels with one micron diameter glass fibers containing uranium oxide to a flux of $2.5 \times 10^{12}$ neutrons per square centimeter per second at 10° C .and 10 atmospheres. In these experiments, part of the kinetic energy of the fission fragments which were emitted from the small diameter glass fibers was absorbed by the reactant phase and utilized for effecting the chemical conversion of the reactants present. ("Glass Fibers, A New Form for Reactor Fuels," Harteck and Dondes, Neucleonics, volume 15, No. 8, 94 et seq., August 1957.)

In British Patent No. 770,594, publisher March 20, 1957, it is shown that a large number of chemical reactions may be initiated by causing fissionable atomic nuclei, which have been dispersed in solution or in very finely divided form throughout the reactants, to fission. Fissionable material, either in solution or in the form of particles of uranium oxide of less than 15 micron diameter and preferably less than 6 microns, is mixed with organic reactants in the liquid phase and caused to fission, whereby the effects of the fissioning nuclei are used to produce organic molecular fragments, which then combine to produce desired compounds. It is disclosed that the organic fragments result from rupture of carbon-hydrogen bonds, carbon-carbon bonds, carbon-oxygen bonds or hydrogen-oxygen bonds and may or may not be free radicals, depending on the bond that is ruptured and the mechanism by which the rupture occurs. It is shown that a wide variety of organic reactions can be effected in this manner. One such type of reaction is the reaction of a simple compound with itself to produce a dimer of the molecular fragment formed from carbon-hydrogen bond rupture, for example, the conversion of methanol to ethylene glycol and formaldehyde, conversion of ethanol to mixed butanediols, conversion of acetic acid to succinic acid and of isobutane to iso-octane. Also, reactions between dissimilar organic compounds are described, for example, conversion of methanol and hexane to heptanols, conversion of heptane and acetic acid to mixed caprylic acids and conversion of heptane and acetonitrile to caprylonitrile.

Those of the above systems which involve utilization of kinetic energy from the heavy fission fragments depend upon direct transfer of kinetic energy from the fission fragments to the fluid reactant. In these systems, the fissionable material is either dissolved in the reactant liquid or very small grains of fissionable material or of non-porous carrier material containing fissionable material are mixed with the reactants. On the other hand, Coekelbergs et al., in a paper entitled "Investigation of a Nuclear Fuel Making It Possible to Use the Kinetic Energy of Fission Products For Chemical Synthesis," presented at the Second International Conference on the Peaceful Uses of Atomic Energy and presented in volume 29, pages 424–32 of the Proceedings thereof, have incorporated naturally occurring uranium in finely divided, microporous solids and examined the reactions of $N_2O$ in the presence of such materials when subjected to the neutron flux obtainable in a nuclear reactor. Natural uranium oxide was dispersed in finely divided, large surface area, microporous alumina, active carbon and silica gel base supports, the exact shape and particle size of which are not specifically disclosed. It is shown that, due to the transfer of part of the fission fragment energy from the microporous solids to the fluid reactant phase, the velocity and amount of conversion of $N_2O$ to $N_2$, $O_2$ and $NO_2$ are greatly increased over the velocity and amount of conversion observed for a given radiation intensity in the absence of the microporous supports. In other words, the presence of the microporous material in which the fissionable material is dispersed greatly increases the G for the chemical conversion, where G expresses the number of molecules of fluid reactant product formed or reactant feed which disappears in the chemical reaction for a dissipation of 100 ev of fission fragment energy. In effect, a substantial amount (up to about 20% in some cases) of fission fragment energy absorbed by the carrier is transferred therefrom to the fluid reactant phase where it may be, at least in part, utilized and transformed into chemical energy.

*Problem*

The contact materials disclosed in the last-mentioned reference are characterized by a very low contents of $U^{235}$, being of the order of less than one-quarter of one percent by weight. Also, the systems disclosed in references hereinabove-mentioned are such as to permit substantial quantities of heavy solid fission fragments to escape from the carrier material and to enter the fluid reactant stream.

As a result of the fission of an atom of fissionable material such as uranium, for example, some energy is released in the beta decay, radioactive gamma decay, fission neutrons, neutrinos and prompt fission gamma radiation. However, about 80% of the total energy released is in the form of kinetic energy of fragments of larger mass. There are a large number of these fragments varying in mass number from 72, an isotope of zinc, to 158, an isotope of europium. However, most of the fragments fall into a light group with mass numbers from about 85 to 104 and a heavy group with mass numbers from 130 to 149. Among the nuclides which have been noted in the fission products from $U^{235}$, for example, are xenon-135, cesium-137, strontium-89, barium-140, yttrium-91, cerium-141, zirconium-95, krypton-85, molybdenum-99 and iodine-131. For a given mass number, fragments have been observed with atomic numbers varying over a range of three or more, for example, tellurium-133, a solid at normal conditions, iodine-133, solid or vapor, dependent upon temperature, and xenon-133, a gas at normal conditions, all have been observed among the fission products.

Many of the fragments formed by the fission reaction are radioactive and some of the normally solid fragments formed have relatively long half lives. Escape of such materials from the carrier particles results in contamination of the fluid reaction products with radioactive material and complicates product recovery. It is important to prevent such escape for the above reason and also, of even more importance, in order to insure maximum utilization of the fission fragment kinetic energy for conducting the chemical conversion or transformation of fluid reactants present.

Also of considerable importance in a process for utilizing fission energy for conduct of chemical conversions in the presence of porous contact materials will be the provision of means for attaining practical efficiency of neutron utilization for promoting nuclear fission, reasonable periods of contact material usefulness and efficient utilization of the total energy released by nuclear fission.

*Objects*

A major object of this invention is the provision of an improved method which may be applied to many chemical reactions of commercial importance for utilizing the unusually high recoil energy of nuclear fission fragments for conduct of chemical reactions and transformations in the presence of porous, solid contact materials, particularly microporous, solid particles.

A specific object of this invention is the provision of a method for utilizing the kinetic energy of nuclear fission fragments to bring about the conversion of fluid chemical reactants to fluid products of different composition, which method permits an economically practical efficiency of neutron utilization for promoting nuclear fission and an improved efficiency of conversion of fission energy to chemical energy while avoiding excessive contamination of the fluid reactant product with normally solid fission product fragments.

Another object is the provision of a practical method for utilizing the kinetic energy of nuclear fission fragments for conducting chemical conversion of fluid reactants without excessive contamination of fluid reaction products with normally solid radioactive fission fragments, which method also permits control of the conversion temperature and recovery of unused fission energy as power.

These and other objects of this invention will become more readily apparent from the following description thereof.

*Summary of invention*

Application and use on a practical and economically feasible basis of the phenomenon of transformation of kinetic energy of normally solid fission fragments to chemical conversion energy in the presence of microporous solids are made possible in accordance with this invention by control of the enrichment and concentration of fissionable material in the microporous solids and by careful control of the size and shape of said solids in conjunction with certain manipulative process steps hereinafter described.

Specifically, the invention involves a method for utilizing the kinetic energy of the fission fragments for the conduct of those chemical conversions or transformations of fluid reactants to fluid products of different composition which require supply of substantial amounts of energy.

In accordance with this method, the fluid reactant feed material is contacted in a confined zone with a mass made up of one or more bodies of porous contact material, preferably particle form contact material containing dispersed fissionable material in sufficient concentration to render said mass, in its environment in said zone under the conversion conditions, including suitable neutron moderation and in the presence of suitably controlled neutron flux, capable of effecting a neutron-multiplying fission reaction when a suitable neutron flux is maintained in said mass. In one form of the invention, the amount, arrangement and nature of the mass and the concentration of fissionable material in the mass are such as to render it capable, under the conditions in the conversion zone, of supporting a self-sustaining, neutron-multiplying fission reaction, which can be regulated by use of moderators and control rods and the like in known manner. A neutron flux is maintained in the mass and the neutron flux is controlled and the neutrons are moderated so as to promote the neutron-multiplying fission reaction, with resultant release of high energy fission fragments, chemical conversion of the fluid reactant feed and concurrent transformation of some of the kinetic energy of the heavy fission fragments to chemical energy. Where the mass is subcritical, the neutron flux is provided from an outside source, and it may be controlled and moderated either within or outside of the mass and usually both. Where the mass is critical or above critical, self-generated neutrons are controlled and moderated in the mass. The neutron flux may be controlled by regulation of the amount of material in the conversion zone having high thermal neutron capture cross-section or by regulation of the amount of moderator and reflector material present or by any combination of these. The neutron flux is so controlled in the mass to promote or insure at least sufficient fission reaction to supply the energy required for the chemical conversion of the fluid reactant feed to the desired products. The shape and size of the bodies of contact material making up the mass are carefully controlled in such manner that substantially all of the normally solid fragments of fission are initially retained within the bodies. Thus, maximum utilization of the kinetic energy of the fission fragments and transformation thereof to chemical energy at the active sites in the pores of the contact material particles occurs. Also, the fluid products of the chemical conversion are recovered without excessive contamination with normally solid fission fragments by separation from the contact material and withdrawal from the conversion zone.

In accordance with the preferred form of this invention, the contact material is maintained at a temperature level suitable for the chemical conversion and below a level which would cause serious heat damage to the contact material at least in part by removing from the contact material as thermal energy the excess fission energy which has not been transformed to chemical energy. The heat may be removed from the reactor either as sensible heat in the reactant stream or by means of suitable heat exchange media, when needed, or a combination of both. The temperature in the contact mass may also be controlled in part by control of the neutron flux in the contact material mass.

In one form, operation in accordance with the method of this invention is made continuous by at least periodically withdrawing used, particle form contact material from the reaction zone and replenishing the mass in the reaction zone with fresh contact material.

In another form, the contact material mass may be made up of one or more larger bodies in other than particulate form, which are suitably supported and distributed in the reactor between the reactant inlet and outlet. Each of these expansive members may be comprised of a suitably supported layer of solid, microporous carrier material containing fissionable material dispersed in grain size less than about 6 microns and having a thickness less than about one inch but at least sufficiently great so that substantially all of the normally solid fragments resulting from fission of the fissionable material therein are retained in the layer of microporous carrier material.

*Concentration and enrichment of fissionable material*

In order to transmit to the fluid reactant phase as high a percentage of the fission fragment energy as possible, it is necessary to disperse the fissionable material in grain size substantially smaller than the length of fission fragment path therein (i.e., grain size less than about 6 microns), and to maintain the ratio of the weight of fissionable material to weight of fluid reactant, i.e., ratio of stopping power of fissionable material to stopping power of fluid reactant, as low as possible. From a nuclear standpoint, diminution of the grain size and density of the fissionable material in this manner tends to increase neutron capture by the non-fissionable material present, leading to decrease in neutron economy, and also tends to decrease fuel life. This tendency may be counteracted by control of the concentration of fissionable material in the contact material. In case of naturally occurring fissionable materials, such as $U^{235}$, this also involves suitable enrichment, e.g., enrichment of the $U^{235}$ content of naturally occurring uranium.

In order to provide a practical efficiency of neutron utilization for promoting nuclear fission and to provide a practical contact material life in accordance with the method of this invention, the lowest acceptable level of concentration of fissionable material corresponds to that minimum at which the amount of fissionable material in the aggregation or mass of contact material in the conversion zone as herein described and its distribution within the space occupied by such mass is just enough, under the environment conditions in the conversion zone during the chemical conversion process operation, including provision of suitable moderation, to permit a neutron-multiplying reaction to persist so long as neutrons are introduced into the mass from an outside source such as a radium-beryllium source. "Neutron multiplying fission reaction" as employed herein in describing and claiming this invention is intended to mean that the nuclear fission conditions in the mass are such that the effective ratio of neutrons existing in the daughter generation within the contact material mass to the number of neutrons existing in the parent generation is above about 0.95. This requires such neutron multiplications that even in the minimum case when the mass is subcritical the neutrons which flow into the mass from the external source are multiplied by at least a factor of 20, but in the minimum case when the outside neutron source is removed, the neutron-multiplying reaction will stop.

It is, of course, contemplated in accordance with this invention that the concentration of fissionable material provided in the contact material mass may be and usually will be above the minimum level above discussed; and, in one preferred form of the invention, the amount of fissionable material in the contact material is sufficient to render the mass of said contact material in the conversion zone, in the environment therein, including suitable neutron moderation, capable of effecting a self-sustaining, neutron-multiplying fission reaction of critical or above critical level.

It will be realized that the concentration of fissionable material is not only one of weight percentage, but it is also a matter of the concentration of fissionable material in space; and, therefore, the physical size and shape of the contact material body or bodies and the nature of their packing and percentage of interparticle voids enter into the determination of the concentration of fissionable material in an aggregation of particles. It is well known that the efficiency of neutron utilization for the fission reaction depends upon such factors as the physical geometry of the system and the nature and extent of neutron reflectors employed, both of which affect the amount of neutrons completely lost from the system. Other factors are the degree of enrichment of the material containing the fissionable material, for example, the amount relative to $U^{235}$ of $U^{238}$ which will capture neutrons without fission and the amount and nature of the moderator and other materials, such as the microporous support material and the reactor construction members, present in the mass or in the vicinity of the mass, which are capable of parasitic capture of neutrons. Usually graphite, water and heavy water are employed as moderators in atomic piles. In the present invention, it is advantageous in many cases to employ the reactant fluid itself as moderator and in other cases to incorporate suitable moderating material into the composition of the microporous carrier body or bodies.

Further, with respect to the concentration of fissionable material provided in the contact material in actual operation in accordance with the method of this invention, it is essential that the concentration of the fissionable material in the contact material making up the mass in the conversion zone be sufficient to render said mass, in its environment in said zone under the conditions of conversion, including suitable neutron moderation, capable of effecting a neutron-multiplying fission reaction in the presence of suitable neutron flux. In one form (A) of the invention, the mass composition geometry and arrangement in the conversion zone, its environment in said zone during periods of fluid reactant conversion, including the amount and arrangement in or closely adjacent said zone of materials having good neutron moderation and reflection characteristics and of materials having high capture cross-sections for thermal neutrons and the nature and amount of fissionable material in the contact material particles are altogether such that it is necessary to provide a suitably controlled neutron flux from an outside source in order to promote a neutron-multiplying fission reaction, such reaction persisting only so long as outside neutrons are supplied. In another form (B) of the invention, the mass composition geometry and arrangement and the environment factors mentioned above and the concentration of fissionable material in the contact material are such that the mass is capable of and does effect a self-sustaining, neutron-multiplying, nuclear fission reaction. In this case, it is unnecessary to supply outside neutrons to provide the neutron flux, but the neutron flux in the mass may be controlled by moderators and control materials in a known manner similar to that used for atomic reactors. In still another form (C) of the invention, while the nature, composition and fissionable material content of the contact material are such as to render some aggregate or some aggregates of such contact material capable of effecting a self-sustaining, neutron-multiplying, nuclear fission reaction in the presence of suitable neutron moderation, the geometry of the mass and its other environment conditions in the chemical conversion zone are such that the neutron-multiplying reaction which occurs is subcritical and persists only so long as outside neutrons from some source such as a nuclear reactor are added to the mass. The term "neutron-multiplying fission reaction" as employed herein in describing and claiming this invention is intended to generically cover all of the above forms (A–C).

It has been found that, if unenriched uranium is dispersed in the microporous contact material, even in relatively high concentration, it is not possible to provide a mass of such contact material which is capable of effecting a "self-sustaining neutron-multiplying fission reaction" and it is unlikely that a mass capable of effecting a "neutron-multiplying fission reaction" could be provided. Hence, when $U^{235}$ is employed as the fissionable material, it has been found essential to the proper conduct of the method of this invention to enrich the $U^{235}$ content of the uranium or uranium compound so that it is substantially greater than the $U^{235}$ content of naturally occurring uranium. The minimum required degree of enrichment will depend upon a number of factors, as will be apparent from the above discussion of required concentration. In general, as the density of uranium in the aggregate decreases, the required enrichment in fissionable isotope increases. By way of example, in the case of uranium, the required enrichment in $U^{235}$ may be within the range of 4 to 80% and more of the total uranium.

It will be apparent from the above that the concentration of fissionable material and its degree of enrichment as incorporated in the porous contact material which will be required to render the mass capable of a neutron-multiplying reaction or a self-sustaining, neutron-multiplying reaction in accordance with the method of this invention, will vary, depending upon the microporous support material, the fluid reactants and the operating conditions involved, as well as upon the factors above mentioned and certain other factors which will be apparent to those acquainted with design of nuclear reactors and enrichment of fuel material therefor. The considerations involved in and methods employed in estimating the geometry for self-sustaining nuclear reactors are discussed in detail in many publications, such as Edlund & Glasstone, Elements of Nuclear Reactor Physics, Van Nostrand Co., 1952; Glasstone, Principles of Nuclear Reactor Engineering, Van Nostrand Co., 1955; Weinberg & Wigner, Physical Theory of Neutron Chain Reactions, University of Chicago Press, 1958; Bonilla, Nuclear Engineering, McGraw Hill, 1957; Schultz, Control of Nuclear Reactions and Power Plants, McGraw Hill, 1955. These publications also include consideration of the various factors influencing efficiency of neutron utilization for promoting nuclear fission and the manner in which these factors must be controlled to convert a subcritical but neutron-multiplying nuclear reactor system into a critical system. Similarly, methods for enrichment of uranium for use as reactor fuel are well known and are discussed, for example, in Cohen, Theory of Isotope Separation, McGraw Hill, 1951; Glasstone, Sourcebook on Atomic Energy, Van Nostrand Co., 1950; Second Geneva Conference on Peaceful Uses of Atomic Energy, 1958, Volume 4 of Proceedings; Etherington, Nuclear Engineering Handbook, McGraw Hill, 1958; Smyth, Utilization of Atomic Energy for Military Purposes, 1945, Princeton, University Press.

"Fissionable material," as used herein in describing and claiming this invention, is intended to mean those materials which undergo nuclear fission as a result of absorption of thermal neutrons. Materials of this type which are presently known are uranium-235, uranium-233 and plutonium-239. The above fissionable materials may be used alone, in admixture with one another, or in admixture with other nuclides which can undergo nuclear reaction with the fissionable material.

General form of contact material

The body or bodies making up the contact material mass may be in the form of one or more non-particulate, expansive members of suitable form and shape such as a tube, rod, slab, block or plate. Usually, such "construction members" are formed from sheet-like members. One or more of such members may be suitably supported in the reactor in the path of fluid reactant flow in such a way as to permit reactant flow through the conversion zone at reasonable pressure drop, while still providing for uniform contacting of the fluid reactant material with the contact material and so as to satisfy geometry and other considerations involved in nuclear reactor design. It is much preferred, however, because of considerations involving provision of uniform and extensive contacting between mass and fluid reactant and because of the ease of removing spent contact material and replacing it with fresh material, that the bodies making up the contact material mass in the conversion zone be in the form of discrete, solid particles shaped and sized as hereinafter specified. The particles may take any of a number of shapes such as spheres, extruded or formed cylinders, pills, tablets, pellets, cubes or even particles of irregular shape. Spherical particles are particularly preferred because of their strength and regularity of shape. It will be understood that the term "particle form," as used herein in describing and claiming this invention, is employed in a sense sufficiently broad to include particles of any or all of the above-mentioned shapes. It is preferred to employ particles in which the maximum transverse dimension is not more than 5 times the minimum transverse dimension. The term "body" is employed in a sense sufficiently broad to cover one of such particles of contact material or a larger, non-particulate member of other form such as mentioned above.

The mass of particle form contact material may be maintained in the conversion zone in the form of a bed or column which may be fluidized but which is preferably substantially compact. For liquid phase operation, the columnar mass may be maintained in partially expanded condition in order to permit higher rates of liquid throughout.

Retention of heavy fission fragments

The mean path of the heavy fission fragments in microporous solids of the type employed in this invention before the fragments have given up their kinetic energy and come to rest is of the order of tens of microns, depending somewhat on the porosity of the solids and the nature of the fluid reactant in the pores thereof. In order to insure maximum utilization of the fission fragment kinetic energy for conducting the chemical conversion or transformation of the fluid reactants present, it is important to cause the fragments to come to rest within the contact material body or bodies or in the fluid reactants while within the pores of the contact material particles, rather than permitting them to escape from the surface of the body or bodies. This is accomplished in accordance with the method of this invention by controlling the shape and size of the particles or the layer thickness of the large, non-particulate body or bodies making up the contact mass so that the average weighted volume distance from within all portions of the body or bodies in which fissionable material has been substantially uniformly dispersed to the nearest external surface thereof (which distance is hereinafter referred to as Y) is greater than that expressed by the equation:

$$Y = \frac{10}{3} \left( \frac{500}{(1-P)d_s + P d_r} \right)^{1/2}$$

where Y is expressed in microns, P is the volumetric fraction of pores in the particle, $d_s$ is the true density of the solid material in grams per cc. and $d_r$ is the density in grams per cc. of the liquid or of the gaseous reactant material in the pores of the contact material under conversion conditions. It will be noted that $d_r$ may be the density of a liquid or gaseous material depending on the phase of the reactant in the pores. In the case of particles having a cores which is free of fissionable material, only that portion of the particle volume containing the dispersed fissionable material is considered in estimating the value of Y. For particles of essentially smooth surface and regular shape, i.e., spheres, cubes, polyhedrons, cones, cylinders, parallelopipeds, etc., the weighted volume distance from within all portions of the contact material particle to the nearest external surface is equal to the ratio of the overall volume of the particle to its external smooth surface area expressed in consistent units. In the case of particles having smooth surface but irregular shape, the value of Y can be estimated by theoretically subdividing the particle into its various component shapes for the purpose of calculation or by use of other known methods for estimating the volume and external surface area of irregular shaped, smooth surfaced particles. In the case of particles having rough or irregular surface, whether of generally regular or irregular shape, i.e., particles having indentations and/or protrusions on the external surface of dimensions less than 50 to 100 microns, the value of Y may be conveniently estimated by treating the particle as a smooth surface particle of the same shape, the surface of which is dimensioned so as to volumetrically average the protrusions and indentations. For example, in the case of a particle of generally sperical shape, having its external surface broken by a plurality of small, hemispherical indentations which decrease the particle volume by a given amount (V') and a plurality of hemispherical protrusions which add to the sphere volume by a given amount (V''), the volume over surface area ratio can be calculated on the basis of a smooth surface sphere sized to have the same actual volume as the one with the protrusions and indentations (the volume of the latter being calculated by taking due account of the protrusions and indentations). The effective external surface of large bodies having irregular surfaces is determined in a similar manner. Usually for microporous materials of the type employed in the method of this invention, the values of $d_s$ range from about 1.8 to 4.0 and the pore volumes from about .30–.70 although in some cases the values may fall outside these ranges. The value of Y for such microporous material will fall within the range about 25 to 130 microns and usually within the range 50 to 100 microns when the pores of the contact material particles are filled with reactant in the gaseous phase. The values of Y will be generally about 4 to 20 microns lower than those above indicated when the pores are filled with reactant in the liquid phase depending upon pore volume of the particles and density of the liquid. It is of interest to note that in the case of spherical particles the diameter required to provide the minimum allowable Y value will be six times the Y value and for particles of cubical shape the required length of the cube sides will be about six times the Y value. This does not mean however, that it is sufficient in order to insure initial retention of substantially all of the heavy fission fragments in the particle to provide particles having lateral dimensions as determined by usual screen analysis six times greater than the above specified Y value or above some other specified value. A particle in the shape of a rectangular parallelopiped having side dimensions of one inch by one inch by 25 microns, for example, would not pass through a screen having an opening only slightly less than one inch; yet, a very substantial fraction of the heavy fission fragments would escape from such a particle. On the other hand, microporous particles of the type employed in this invention containing uniformly dispersed, fissionable material will initially retain (i.e., bring to a stop within the particles) substantially all of the heavy fission fragments. Gaseous fragments will thereafter diffuse from the particles via the pores. Also in those cases where the fluid reactant is liquid, there may be some tendency for the liquid to carry out through the pores those solid fission fragments which come to rest in the pores of the particles. However, there will also be a tendency for such fragments to be filtered out from the liquid and left behind on the pore walls. Also any low energy solid fragments which eventually should escape from one particle are usually adsorbed onto other porous particles in the bed which acts as a filter bed. Hence even for liquid phase conversions all but a small portion of the normally solid fission fragments should be permanently retained by the solid particles of contact material. It will be understood that the term "substantially all of the normally solid fission fragments," as used herein in describing and claiming this invention with relevance to fragments retained in the contact material particles, is intended to mean that no more than about 10% of the heavy fission fragments having maximum travel range in the porous solid material will initially escape the particles and the average initial retention, based on all the normally solid heavy fission fragments will be substantially greater than 90%.

It will be understood from the above that in the selection of contact material particles adapted to initially retain substantially all of the normally solid fission fragments, it is necessary to consider not only the size of the particle but also its shape, porosity and the true density of the solid material. In any case, the nominal diameter of the particles should be sufficient when correlated as above discussed with the other factors mentioned to permit provision of the minimum required Y value. In general the minimum nominal diameter will be at least about 150 microns and usually substantially more than this depending upon said other factors. The maximum nominal diameter for discrete particles in accordance with this invention is about one inch. Preferably the particles have nominal diameters within the range about 1500 microns to one-half inch and usually about 0.1 to 0.25 inch. The term "nominal diameter," as employed herein in describing and claiming this invention, refers to diameter determined on the basis of particle density and weight measurements from the equation $$D_n = \sqrt[3]{\frac{6}{\pi d_p N}}$$

where $D_n$ is the nominal diameter of the particle in centimeters, $d_p$ is the density of the particles in grams per cubic centimeter and N is the number of particles per gram.

When the contact material mass is made up of expansive members such as slabs or pipes, such members usually have one or two exposed broad sides of substantial surface area, the remaining sides or edges having insignificant surface area. When both of the broad surfaces of such microporous members are exposed and the fissionable material is uniformly dispersed therein, the microporous layer should have a thickness at least greater than two times the value of Y calculated by the above mention equation. When one of the broad surfaces is shielded by suitable reflecting material such as graphite or beryllia, then the microporous layer should have a thickness greater than the value of Y calculated by the above equation; i.e., the average weighted volume distance from all portions therein containing fissionable material to the nearest exposed surface should be greater than Y.

By operation of the chemo-nuclear process in the manner herein disclosed using contact materials shaped and sized in the manner disclosed, it is possible to initially stop substantially all of the heavy fission fragments within the porous contact material bodies, whereby the enormous amount of kinetic energy in such fragments is recovered therefrom at locations where it is most likely to be transformed to chemical energy and to beneficially affect the action of microporous contact material and the course of the chemical reaction. Fission fragments which are normally gaseous under the conditions of temperature and pressure maintained in the contact material, for example, nuclides of xenon, krypton and, in some cases, iodine and bromine, after transfer of their kinetic energy to the contact material or reactant fluid within the contact material pores, will eventually escape from the contact material bodies by diffusion through the pore passages. Such gaseous fragments are initially radioactive but decay by beta and gamma emission largely to stable nuclides in a relatively short time. On the other hand, the half lives of the radioactive, normally solid fission fragments are, in general, much longer and, depending on the nuclide, the time required for decay to stable nuclides may be a matter of months or years. Thus, by retention of these normally solid, radioactive fragments in the body, bodies or particles of contact material in accordance with the method of this invention and by separation of the fluid chemical reaction products from the contact material by separate withdrawal thereof from the conversion zone, the problem of cooling off and decontamination of the fluid chemical reaction products is greatly simplified. Moreover, by provision in the conversion zone of a mass of contact material containing within its constituent bodies an amount of fissionable material sufficient to render the mass, under the conditions in said zone during chemical conversion and in the presence of suitably controlled neutron flux, capable of effecting a neutron-multiplying fission reaction, practical efficiency of neutron utilization for promoting nuclear fission and practical periods of contact material usefulness are made possible.

*Contact material—General*

The contact materials employed in the method of this invention should be made up of a body or bodies having a large surface area—in general, about 5 to 1,500 square meters per gram and preferably 50 to 700 square meters per gram. The pore volume should amount to about 5 to 70% of the total particle volume and preferably 30 to 50%. While, in less preferred forms of the invention, bodies having only macropores may be employed, it is much more preferable to employ microporous bodies, which term is employed herein in describing and claiming this invention as meaning bodies having at least 5% of their volume devoted to pores and at least 25% of the total pore volume devoted to pores having radii less than 100 angstroms. It will be understood, of course, that the total pore volume of such microporous bodies may include pores ranging from about 4 angstroms to 100 microns radius. Bodies in which a major portion of the pore volume is made up of pores having radii from about 4 to 100 angstroms are particularly well adapted for use in the method of this invention. The contact material may range in apparent bulk density from about 0.4 to 3.0 and in particle density from about 0.8 to 6, depending upon the material. Measurement of pore size and pore size distribution in various porous materials are discussed by L. C. Drake and H. L. Ritter in Industrial and Engineering Chemistry, Analytical Edition, volume 17, pages 782 to 791, 1945. Methods described there may be employed in determining bulk density, average pore diameter and other pore measurements referred to herein. The term "surface area," as used herein, designates the surface area of the porous contact material as determined by the adsorption of nitrogen according to the method of Brunnauer et al., Journal of the American Chemical Society, 60, page 309 et seq., 1938.

The porous carrier material may take any of a large number of forms, depending upon the particular chemical reactants and reactions to be conducted. It has been noted that some porous materials may be more beneficial than others when used for effecting specific chemical reactions in accordance with the method of this invention and that the effectiveness of a particular porous material may depend on operating conditions. In general, the material selected for any given application should have pores sized to permit ingress and egress of the fluid reactant involved. In general, it is expected that porous materials which are well adapted as catalysts for chemical conversion of given fluid reactants in the absence of fission fragments will also be well adapted for use in the method of this invention as applied to the conversion of the same reactants, and the advantages of this invention may be expected to result. The carrier may comprise synthetic or naturally occurring porous and preferably microporous materials, for example, siliceous earths such as diatomaceous earth, infusorial earth and kieselguhr; natural clays and clay-like materials such as kaolin and montmorillonite clays, bentonite, Fuller's earth, Superfiltrol, bauxite and porocel; porous ceramic materials such as unglazed porcelain; natural or artificial zeolites; molecular sieves such as naturally occurring chabazite, selective synthetic zeolite or aluminum silicate selective adsorbents, for example, calcium aluminum silicate; chamotte; asbestos; pumice; talc; activated carbon, graphite or bone charcoal; hydrosilicates, particularly those of aluminum; synthetic inorganic materials such as activated alumina, magnesium oxide and gels of silica, alumina or silica and alumina or similar gels containing zirconia, chromia or molybdena. The surface area and porosity characteristics of such carrier materials may be, to some extent, regulated by the method of their preparation or treatment. In general, the carrier material is an "inorganic material," this term being employed herein in a sense sufficiently broad to cover activated carbons, bone char, graphite and charcoal, which are essentially carbon, even though, in some cases, such carbons may contain small amounts of hydrogen. In general, the carrier material should have a capture cross-section for thermal neutrons below about 10 barns and preferably below one-half barn. It may be necessary to treat the carrier material, particularly those of natural origin, in order to improve the physical properties thereof and to remove therefrom materials the presence of which is undesirable from the standpoint of the chemical reaction. It may also be necessary, in some cases, to treat the carrier material with acids or other suitable chemicals to effect removal therefrom of elements having high neutrons capture cross-sections such as lithium, cadmium, samarium, gadolinium, boron, cobalt and europium or other undesirable materials such as nitrogen and sulfur compounds. Certain metals or metallic compounds may be added to the carrier material either by impregnation, coprecipitation or cogelling because of their beneficial catalytic influence on the chemical reaction involved. Exemplary of such catalysts and supports therefor and reactions for which they are useful are: mixtures of silica with alumina, zirconia or magnesia for the catalytic cracking of hydrocarbons; chromia or molybdena on alumina or cogelled chromia-alumina or molybdena-alumina catalysts for hydrogenation or for dehydrogenation and reforming of hydrocarbons, particularly those in the gasoline boiling range; platinum or nickel on alumina containing halogens or on silica gel for isomerization of hydrocarbons; chromia on alumina or on silica-alumina gels for dealkylation of alkyl aromatic hydrocarbons; mixtures of alumina, tungstic acid and ferric oxide (or zinc oxide) for various dehydration or hydration reactions, that is conversion of alcohols such as ethyl alcohol to olefins or the reverse depending upon the specific catalyst and reaction conditions, the oxide mixture may be employed alone after impregnation with fissionable material or it may be mixed with suitable inert porous carrier material in order to increase the porosity of the overall contact material; a mixture of the oxides of copper and tungsten on charcoal for the hydration of ethylene; mixtures of iron oxide with chromia and potassium oxide on suitable carrier such as microporous alumina for dehydrogenation of ethyl benzene to styrene; mixtures of iron oxides promoted with alumina or potassium oxide, usually partially reduced by low temperature gaseous reduction for the Fischer Tropsch or ammonia synthesis, the carrier material in this case may be silica gel, or kiselguhr, for example; vanadium oxide on asbestos for oxidations such as that of naphthalene to phthalic anhydride, or of sulfur dioxide to trioxide; sulfides of tungsten, molybdenum and of iron group metals (Fe, Co, Ni) on suitable support such as alumina for the hydrogenation of coal—tar heavy oil or sulfur containing material in general; nickel on alumina or silica for conversion of hydrogen and carbon monoxide to $C_1$–$C_4$ gaseous paraffins; mixtures of copper with chromia with or without added porous inert carrier such as pumice or kieselguhr for hydrogenation of carbonyl and carboxyl containing compounds to alcohols, mixtures of copper and zinc on silica or alumina for the dehydrogenation of alcohols; silver on pumice for dehydrogenation of alcohols, such as the conversion of methanol to formaldehyde and palladium on bone charcoal for reduction of ketones. When the catalytically active metal or metal compound constituent of the carrier has a relatively high neutron capture cross-section, its concentration in the carrier is restricted to a level, usually below one percent, at which it will not seriously interfere with the neutron efficiency of the system.

*Preparation of contact material*

Methods for the treating or manufacture of the catalysts and carrier materials referred to above and of other catalysts and microporous carrier materials are well known to those familiar with the arts of catalysts and catalyst manufacture. For example, the method for manufacture of silica-alumina bead catalyst, useful for catalytic cracking of hydrocarbons, is described in U.S. Patent No. 2,384,946. This catalyst is prepared by cogelation of silica-alumina in a non-aqueous medium to form a spherical hydrogel particle, followed by washing to free of impurities, curing under specified conditions and calcining to a final form which is a hard, attrition-resistant spheroid of the order of one-eighth inch in diameter. Such hydrogels as those of silica-alumina, silica-stannic oxide, silica-zirconia, silica-alumina-zirconia, etc. may be formed. Other materials such as chromia, alumina, zirconia, etc. have been incorporated in such bead materials for various purposes. Also, the internal structure, as well as the overall hardness of such beads has been modified, with particular increase in attrition resistance, by the incorporation of certain amounts of fines of the same general composition as the final bead in the material to be cogelled. Also, if desired, substantial amounts of powdered moderator material having effective thermal neutron capture cross-sections below about 100 millibarns, such as beryllia and graphite, may be incorporated in the gel catalyst.

Another form of such material is made by the coprecipitation of, for example, silica and alumina, hydroxides of chromia or of molybdenum and of alumina, etc., followed by desired washing, curing and calcining of the precipitate and the pelleting of the resultant powdery material, in another method, a catalytically active compound or compounds may be added to a preformed, natural or synthetic, microporous base by impregnation with one or more catalytically active metal compounds by soaking with an aqueous solution of a water-soluble, thermally decomposable salt thereof. For example, activated charcoal or alumina or silica-alumina particles may be impregnated with an aqueous solution of nickel nitrate followed by drying, calcining and finally reduction in the presence of hydrogen. The resulting catalyst is suitable for hydrogenation of organic compounds, particularly hydrocarbons.

The fissionable material may be incorporated in the porous carrier by any of several procedures well known in the art of forming microporous, solid bodies. For example, a water-soluble salt of the desired fissionable element may be admixed with one or both of the reagents to be gelled or precipitated. For example, to incorporate $U^{235}$ in a silica-alumina bead complex formed by cogelation, a soluble salt, such as, for example, the uranyl nitrate, may be present in the alum ingredient of the reaction mix destined for bead formation after the method of Marisic, 2,384,946. Also, solid materials, such as the oxides of the desired fissionable materials may be incorporated in either of the reaction ingredients as above. Similar methods may be applied where the resultant combination is not a gel, but the result of coprecipitation to form a solid which, after suitable washing and drying operations, is tableted, pelleted, or extruded to form a solid particle suitable for catalytic use.

As is also well known in the art of catalyst manufacture, microporous solids such as the beads spoken of above, the pelleted or tableted solids, or the so-called molecular sieve materials can be impregnated with the desired fissionable material by soaking with an aqueous solution of a water-soluble salt thereof, or a solution of a non-water-soluble salt in a solvent which can be removed subsequently from the solid. Thus, for example, a porous alumina may be impregnated with a solution of uranyl nitrate or with molten uranyl nitrate hexahydrate and then heated to decompose the nitrate to the oxide. Uniformity of dispersion may be aided by slowly heating the alumina particles in molten uranyl nitrate hexahydrate under elevated nitrogen or hydrogen pressure with bleed-off of $NO_2$ formed so as to maintain pressure of the order of 100 p.s.i.g. In another method, the carrier such as activated carbon may be impregnated with uranyl nitrate, either molten or as a solution, and the uranium converted to ammonium diuranate by immersion of the particles in cold, saturated, aqueous ammonia and repeating this procedure until all nitrate has been removed, followed by drying and heating to decompose ammonium diuranate to the oxide. In the case of high surface area carbons, impregnation with uranium compounds is more safely carried out by use of soluble uranium acetate with subsequent decomposition by heating. One method for improving uniformity of distribution of fissionable materials in porous matrix material which has been described in the literature involves impregnation of the porous carrier with a solution of uranyl nitrate dihydrate in tertiary butyl alcohol, quick freezing of the impregnated material in liquid nitrogen, sublimation of the solvent below the melting point of the solution by a "freeze-dry" process, followed by heating to 725° C.

The impregnation may be accomplished by exposing porous or microporous carrier material to an appropriate gas or vapor form compound of the fissionable material, for example uranium tetrachloride. Upon treatment with water and heating, the halide is converted to oxides of uranium.

If desired, the carrier material may be pulverized into very fine particles and then mixed uniformly with finely divided fissionable material in powdered or solution form and, if desired, with powdered oxides or solutions of thermally decomposable compounds of suitable, catalytically-active material, as, for example, by impregnation with a solution of the fissionable material. A suitable carbonizable binder is added to the mixture, and the material is then pelleted or extruded to form particles of the desired shape and size, followed by drying, calcining and, in some cases, reduction.

While in the above discussion of methods for preparing the contact material mass bodies emphasis has been directed toward particle form bodies, it will be understood that similar techniques may be employed in the preparation of large, non-particulate bodies. In some cases, a porous carrier material may be selected which offers the combination of reasonable structural strength, low neutron capture cross-section and good moderating properties. Such materials may be preformed in the desired shape and size. By methods already discussed, fissionable material and, if desired, certain catalytically active materials may be dispersed on one side of the member to the desired thickness, for example, for a sheet or slab of graphite 2 inches thick, the fissionable material may be impregnated on one side to a depth of about one-tenth to one-quarter inch. The slab is free of fissionable material through the remainder of its thickness and will not only serve as moderator but will prevent escape of normally solid fission fragments from one side of the slab. The portion of the slab containing fissionable material should, in this case, have a thickness in excess of Y as calculated by equation presented hereinabove in order that substantially all of the normally solid fragments released by fission will be initially retained in the slab. For example, where the slab is formed of a 1 inch block of porous carbon containing dispersed uranium along one of the broad sides and the pore volume and true density of the portion of the slab containing uranium are 40% and 3.0 respectively, the uranium containing portion should have a depth in excess of about 55 microns for gas phase chemo-nuclear conversions. If desired, fissionable material may be dispersed throughout the slab thickness or on both sides thereof and both broad sides of the slab may be exposed for contact with fluid reactants. In this case, care should be taken that the thickness of the slab exceeds two times the value of Y. When the carrier material does not have adequate physical strength, it may be deposited on or bonded to suitable structural support members by known methods. Such support members may be composed of such materials as alumina, Zircaloy (a zirconium alloy containing about 1 to 2% tin and traces of iron, nickel and chromium) and certain stainless steels, for example.

Mechanism

The exact mechanism by which the microporous material serves its very important function in connection with the chemo-nuclear reaction is not entirely known. However, without any intent that the invention be limited thereto, the following discussion of the probable function of the microporous material may be helpful to the understanding of the invention. Porous and preferably microporous materials above referred to present a multitude of pores of small and controlled size distributed throughout a solid capable of retaining shape and volume under handling and operative stresses. Materials to be reacted or transformed, having access to the relatively enormous surface area per unit volume within the micropores, find an environment adapted for reaction or transformation, enhanced in the usual case by numerous active catalytic "sites" existing at or adjacent the walls of the pores. Fissionable material present in the solid bounding the pore walls will, upon fission, give rise to both radiant energy, which acts in known manner on the fluid reactant neutrons and the particles of high mass and high energy spoken of previously. Bombardment of the pore wall material by the radiant energy of fission may, and in many cases will, create electronic anomalies giving rise to "sites" previously non-existent or altering the nature and effectiveness of "sites" already present. Ionizing radiation may cause temporary activation of solid surfaces by electronic excitation and thus bring the surfaces into sufficiently energetic state to cause chemical conversion of fluid reactants contacting such surfaces. Of possibly greater importance is the relatively enormous amount of kinetic energy present in fission fragments of high mass. Such fragments give up their energy by collision processes with the material of the pore wall. Resulting from these collision processes, there may be created both additional electronic anomalies in the material of the pore wall and a great build-up of energy in the material of the pore wall and in other materials which may be associated therewith or which may be found closely adjacent thereto, the total process giving rise both to catalytic "sites" and a supply of energy at relatively high level. This feature is particularly enhanced since the fissionable material is uniformly distributed in very fine grain size within the microporous solid body or bodies. Very elevated heating of very short duration is provided at a multitude of very small "sites" throughout the microporous body or bodies. This can result in permanent modifications of the structure of the pore walls. Fluid reactants which are in intimate contact with the surfaces which are the seat of short duration, high energy concentrations and surface modifications are caused to undergo chemical conversion or transformation. Fission fragments which come to rest in the fluid reactant present within the pores of the contact material directly impart energy to the reactant at a time when it is in intimate contact or close proximity to active sites in the contact material. Carbon-carbon, carbon-$H_2$ or other chemical bonds are broken, resulting in production of molecular fragments of the fluid reactants, some of which may be free radicals. Such molecular fragments combine with similar or dissimilar fragments formed in the system so that chemical conversion to different fluid reactant products results. In accordance with the method of this invention, the fluid reaction products depart from the pores of the contact material body or bodies leaving behind the radioactive, normally solid fission fragments.

Drawings

The method of this invention may be better understood by reference to the attached drawings, of which:

Both of these drawings are highly diagrammatic and schematic in character.

FIGURE 1

Figure 1:
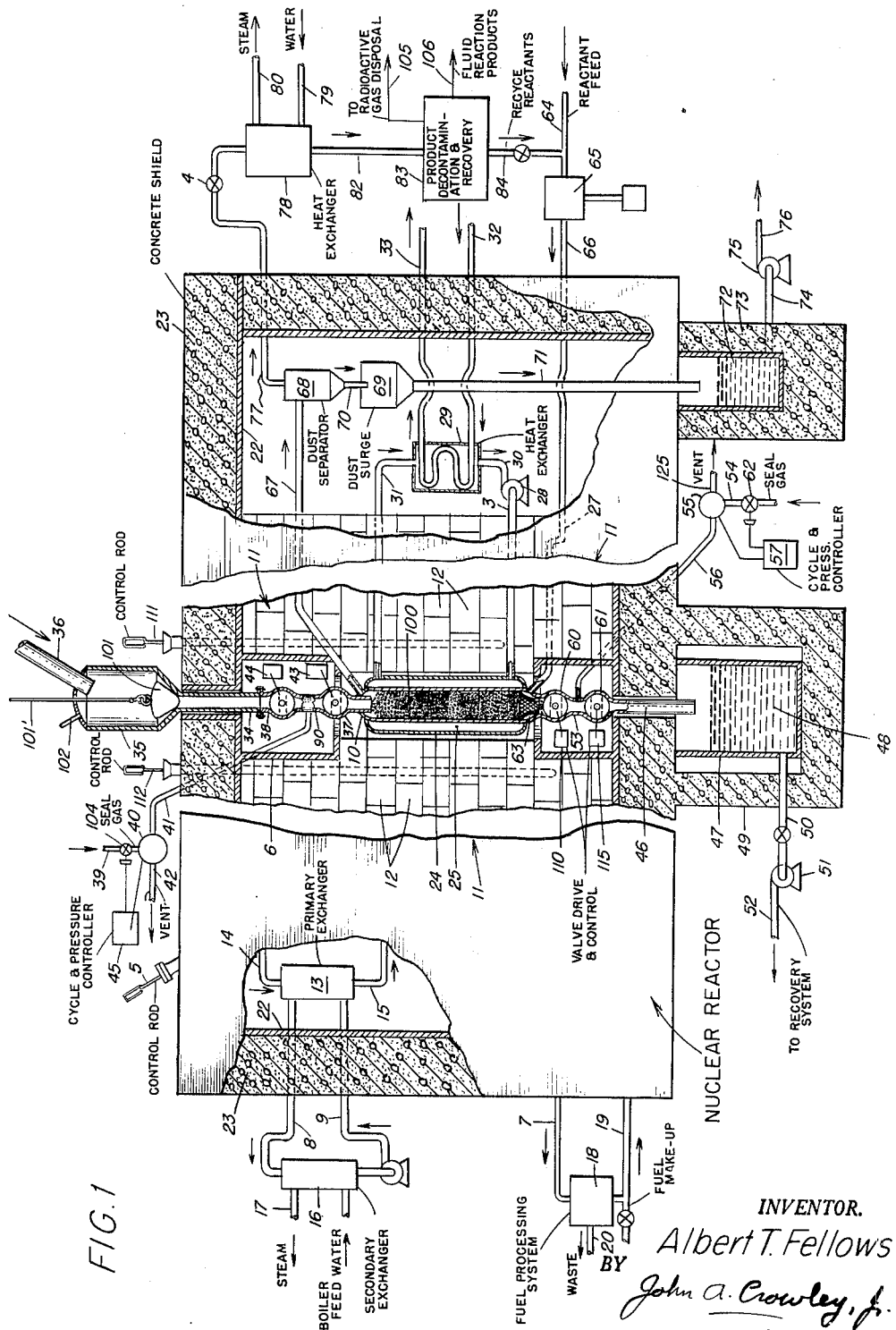
FIGURE 1 is an elevation view, partially in section, of a system for utilizing energy of nuclear fission fragments for chemical conversion of fluid reactants in accordance with this invention.

Referring now to FIGURE 1, there is shown an arrangement for conducting one form of this invention wherein the mass of contact material in the chemo-nuclear reactor 10 is incapable of maintaining a self-sustaining, neutron-multiplying fission reaction. In this form of the invention, it is necessary to supply neutrons from an outside source in order to provide a neutron-multiplying fission reaction in the contact mass. In the arrangement shown, the chemo-nuclear reactor is supported by members not shown within a region of high neutron flux emanating from the core of a self-sustaining nuclear reactor. The core of the nuclear reactor is located in or adjacent to the region 11, and the details thereof are not shown in the drawings. One of the control rods for the reactor is shown at 5. A biological shield comprising plates of iron or steel 22 and a wall of dense concrete 23 surround the entire nuclear reactor-chemo-nuclear reactor system. The self-sustaining nuclear reactor may take any of a number of forms known to persons skilled in the art, modified in arrangement to accommodate the presence of the chemo-nuclear reactor in a manner which will be apparent from the following discussion. Thus, for example, the nuclear reactor may be a liquid-metal-fuel reactor such as described by Williams et al. of Brookhaven National Laboratories in Nuclear Engineering, Part I, pages 245–252, published by American Institute of Chemical Engineers in 1954. That reactor, which is a power and breeder reactor, utilizes $U^{233}$ in molten bismuth as a fuel, graphite as moderator. Around the reactor core, there is provided a graphite breeder blanket in which $U^{233}$ is bred from thorium bismuthide in liquid bismuth. Another type of nuclear power reactor which may be employed is a modified arrangement of the enriched uranium, heavy water moderated type described by J. T. Wells in Nuclear Engineering, Part I (supra) at pages 213–227. In that reactor, $U^{235}$ is dispersed in aluminum plates as the fuel, and these are mounted in rectangular boxes which are removable as units and arranged for heavy water passage therethrough. Several such units are mounted in an aluminum tank which is surrounded by a graphite filled area to augment the region of useful neutron intensities. Alternatively, the nuclear reactor may be a graphite moderated-uranium reactor modified to permit incorporation of the chemi-nuclear reactor. In one form of the invention, the tube or tubes making up the chemo-nuclear reactor may be mounted in the moderator filled region of high neutron intensity surrounding the core of the nuclear reactor. Referring to FIGURE 1, the graphite blocks represented at 12 can be considered as constituting a portion of the moderator filled region of high neutron intensity adjacent the core of the nuclear reactor. Alternatively, the fission fuel elements of the nuclear reactor may be so arranged in the moderator field with respect to the chemo-nuclear reactor that the latter is essentially within the core of the nuclear reactor. FIGURE 1 can be alternatively taken as also showing this latter arrangement, the graphite blocks 12 comprising the moderator in the reactor core, and the fuel elements of the nuclear reactor being embedded in the moderator but not visible in the drawing. In such arrangement, the contact mass in the reactor 10 is, in essence, a portion of the nuclear reactor fuel, being confined out of fluid communication with the remainder of the fuel mass but being in gamma and neutron radiation communication therewith. With this arrangement, it is preferably that the concentration of fissionable material in the nuclear reactor be sufficient to render some aggregate of the contact material capable of effecting a self-sustaining, neutron-multiplying reaction.

In a preferred form of this invention, the nuclear reactor may be employed for the purpose of producing power as well as serving as an instrument for providing fission fragments of high kinetic energy for use in chemical conversion of fluid reactants. Thus, in FIGURE 1, there is shown a primary exchanger 13 for extracting heat from a heat exchange fluid which has been circulated through the reactor core and which enters the exchanger via conduit 14 and returns to the reactor core via a conduit 15. Heat exchange fluid, such as sodium or water, circulates via conduits 8 and 9 between the primary exchanger and the secondary exchanger 16 for the purpose of manufacturing steam from water. The steam passes via conduit 17 to a generator-turbine, not shown.

There is provided at 18 a system of a type known to those skilled in the art for processing the used fission fuel delivered from the nuclear reactor via conduit or duct 7. In the case of liquid fuel reactors, reprocessed and make-up liquid fuel may be returned to the nuclear reactor via conduit 19. Waste material from the fission reaction passes via conduit 20 to a suitable disposal system.

It will be understood that the choice of fissionable and moderator materials, heat exchange fluids, construction materials, the pattern of distribution of the fissionable material in the moderator, the enrichment of the fissionable material and methods therefore, the critical size of the reactive composition comprising fissionable material and moderator required to maintain the self-sustaining reaction, and the means employed to remove the heat generated by the fission reaction, in themselves, do not constitute the present invention, being now known to persons skilled in the art, as exemplified by references cited hereinabove.

Referring now to the chemo-nuclear reactor 10 in FIGURE 1, the reactor shell and other structural members should be constructed of material having as low a neutron capture cross-section as possible while, at the same time, being adapted to dependably confine the reactant fluid and withstand severe corrosion under the temperature, pressure and radiation conditions involved. In general, construction materials employed should have a thermal neutron capture cross-section below about 3 barns. Zircaloy (a zirconium alloy containing about 1 to 2% tin and traces of iron, nickel and chromium), aluminum and certain stainless steels may be employed for the reactor shell. For some low pressure operations, the reactor cavity may be formed in a block of graphite which has been suitably treated to render it essentially impermeable to the reactant fluids involved. A jacket 24 is connected around the reactor shell to provide an annular space 25 through which a heat exchange fluid may be circulated for the purpose of removing heat from the contact mass 100 within the reactor. The fluid is circulated from jacketed space 25 via conduit 31 to heat exchanger 29, thence via conduit 30 to pump 28 and then back to space 25 via conduit 3. Any of a number of suitable heat exchange fluids may be employed, depending upon temperature conditions involved, such as ordinary or heavy water, usually under pressure, molten bismuth or sodium, biphenyl, suitable mixtures of biphenyl and diphenyloxide, lead-bismuth eutectic mixture or a suitable molten mixture of sodium nitrate, sodium nitrite and potassium nitrate. The primary heat exchange fluid may be cooled in exchanger 29 by means of water entering via conduit 32 and leaving either as pressurized water or steam via conduit 33. A contact material feed conduit 34 is connected through the closed upper end of the reactor 10 and depends a short distance down into the reactor so as to provide in the upper section of the reactor a plenum space for vapor reactant disengagement from the contact material bed 100. The contact material feed conduit extends upwardly from the reactor 10 to a supply hopper 35 located outside the concrete shield 23. Contact material is supplied to the hopper 35 via chute 36. A removable concrete plug 101 is positioned in the bottom of hopper 35 so as to cover the upper end of conduit 34 during periods of operation when contact material is not being supplied to the reactor. The hopper 35 is closed on its upper end and is provided with a vent 102, which delivers any gas escaping up through conduit 34 to an elevated stack. A seal lock section 90 is provided at an intermediate point along conduit 34 between two automatically operated plug valves 37 and 38. Inert seal gas is supplied to the lock section from supply conduit 39 via three-way valve 40 and conduit 41. The lock section may be vented through conduit 41, valve 40 and vent conduit 42, the latter being connected to an elevated discharge stack, not shown. Valves 37 and 38 are driven by suitable conventional means shown schematically at 43 and 44, respectively, the timing and operation of which are controlled by instrument or instruments 45. The latter instrument or instruments also control operation of three-way valve 40 and the pressure control valve 104 on the inert gas supply conduit 39. The area in which the valves 37 and 38 are located may be shielded against radiation by suitable shield material shown at 6 or the valves may be located outside the biological shield 23. A contact material discharge conduit 46 extends downwardly from the lower end of reactor 10 to discharge tank 47 which contains a pool of water 48. The tank 47 is surrounded with a protective concrete shield wall 49. After the radioactive contact material in the pool 48 has been permitted to cool, it may be pumped from the tank 47 via conduit 50, pump 51 and conduit 52 to a suitable recovery system, not shown, in which it is processed for recovery of unused fissionable material and other values. A seal lock section 53, similar to section 90, is provided on conduit 46 between automatic plug valves 60 and 61. Inert gas is introduced to lock section 53 via conduit 54, three-way valve 55 and conduit 56. Cycle and pressure control instrument 57 controls the operation of the drive mechanism for valves 60, 61 and 55 and also controls the pressure control valve 62 on the seal gas inlet conduit. A vent to stack 125 is also connected to the three-way valve 55. Adjacent the location at which the conduit 46 connects into the bottom of the reactor 10, there is provided a ring-shaped foraminate partition or screen 63 shaped to permit attachment along its edges to the side shell and bottom of the reactor so as to provide an annular plenum space for fluid reactant distribution. Fluid reactant feed is delivered into the space provided by screen 63 through conduit 66, which connects through the reactor shell at the location of the distribution space. A conduit 67 connects into the upper section of the reactor 10 above the discharge end of conduit 34 and connects on its other end into dust separator 68. A dust surge tank 69 is positioned below separator 68 and communicates therewith through separator drain conduit 70. A drain conduit 71 extends downwardly from surge tank 69 to the water pool tank 72, which is shielded by concrete wall 73. Radioactive contact material dust may be discharged from tank 72 via conduit 74 and pumped by pump 75 through conduit 76 to a suitable processing plant for recovery of fissionable material. Fluid conversion products may be passed from the top of separator 68 via conduit 77 to heat exchanger or boiler 78, in which the products are cooled with resultant vaporization of cooling water entering via conduit 79. The resulting steam may be passed via conduit 80 to a generator-turbine or utilized for other purposes.

Cooled products from chemical reaction pass from exchanger 78 via conduit 82 to suitable product decontamination and recovery system 83. A conduit 84 leads from system 83 to feed pump or compressor 65 for recycling of reactants.

*FIGURE 1 operation*

For the purpose of discussing the operation of the arrangement shown in FIGURE 1, its use for the chemical conversion of methane to hydrogen and $C_2$ to $C_6$ hydrocarbons at 300° F. may be considered. The contact material employed in this instance for the bed or mass in reactor 10 is made up of, for example, spherical particles of active, microporous alumina which has been calcined for one day at about 1,000° F. and which contains 10% by weight of uranium in the form of 40% $U^{235}$ enriched uranium oxide uniformly dispersed in very fine grain size throughout the particles. The particles of contact material making up the mass 100 range in nominal diameter from one-eighth to one-quarter inch, have an average nominal diameter of about 4.7 millimeters, and the average weighted volume distance from all points within the particles to the nearest external surface thereof is about 785 microns. The apparent density of the contact material (without packing) is about 55 pounds per cubic foot.

The true density of the uranium containing solid contact material is about 3.5 and the pore volume about 60%. For this material the minimum Y value under conversion conditions exceeds about 64 microns. The contact material mass is arranged in the reactor 10 in the form of a substantially compact bed 100. The hydrogen in the reactant system and the microporous alumina carrier material, to a certain extent, will act as moderator for neutrons released by fission of the fissionable material in the pellets. To provide additional moderation, graphite spheres of approximately the same particle size as the contact material may be uniformly mixed with the contact material pellets in the bed 100. The volume of the graphite spheres may be approximately equal to the volume of the alumina pellets. The reactor 10 is so positioned in the graphite blanket surrounding the nuclear reactor that the thermal neutron flux radiated through the walls of the reactor and into the contact mass is, in the absence of control rods, of the order of $5 \times 10^{11}$ neutrons per square centimeter per second. As a result, the $U^{235}$ in the contact material is caused to undergo fission. In this case, the amount of the mass 100 and the fissionable material therein is such that the mass 100 is incapable of supporting a self-sustaining, neutron-multiplying reaction, but is capable of a neutron-multiplying reaction as long as outside neutrons are irradiated thereinto. Methane feed gas, which may or may not have been preheated to the desired reaction temperature, enters compressor 65 via conduit 64 and is forced through conduit 66 into the bottom of reactor 10. The reactant gas passes upwardly through the mass 100 at a pressure of about 10 p.s.i.g., controlled by valve 4, whereby it is converted as a result of contacting the microporous particles in the presence of high energy fission fragments resulting from fission of the $U^{235}$. Fluid conversion product containing hydrogen, a mixture of paraffinic and olefinic $C_2$ to $C_6$ hydrocarbons and unconverted methane is withdrawn from the upper section of reactor 10 via conduit 67. Any small traces of contact material dust or carbon formed in the reaction separate in dust separator 68, which may take any of a number of known forms adapted for the purpose. Separated dust falls into the surge tank 69 and from thence via conduit 71 into the pool of water in tank 72. Conversion product passes from separator 68 to exchanger or boiler 78, where it is cooled by indirect heat exchange with water. The cooled product passes to system 83, where it is treated in suitable manner to eliminate dangerously radioactive materials and then sub-divided to the extent desired by conventional methods into constituent chemical components which are withdrawn at 106. As has been pointed out hereinabove, due to retention of normally solid fission fragments in the contact material, the decontamination process is substantially simplified. In general, this involves separation of radioactive gases (withdrawn at 105) and permitting the chemical products to "cool" for sufficient time to permit decay to a safe level of any radioactive isotopes formed as a result of subjection of the reactant fluid to irradiation in the reactor. Methods for effecting radioactive decontamination of fluid chemical materials are known to those skilled in the art and are based on combination methods which are subject to some variation, depending upon the materials in question. In general, these methods rely on aging to permit decay of radioactive materials, followed by filtration through fine filters or porous or adsorptive materials to remove the solids into which these materials decay. It will be understood that methods for effecting decontamination and separation of fluid chemical products are not, in themselves, the subject of the present invention.

The contact material in reactor 10 is maintained at the desired conversion temperature, in this instance about 300° F., by heat exchange with a suitable cooling fluid circulated through the jacketed space 25. When the concentration of $U^{235}$ in the contact material is high in accordance with the preferred form of the invention, the fission reaction releases energy substantially in excess of that required for chemical conversion, which excess energy becomes available as heat. This heat is also recovered in the form of steam in exchanger 29.

When the reactor is small and the concentration of fissionable material is relatively low, the amount of energy available from fission may be insufficient to supply the requirements of both the chemical conversion and the heat lost from the reactor by connection and radiation. In such event it may be desirable to circulate a heating fluid through jacket space 25 to supply the heat lost from the system by radiation and connection.

After a sustained period of use, it may be necessary to replace the contact material either because of accumulation of contaminants deposited during the chemical reaction (in this case, carbonaceous contaminants) or because of accumulation of undesirable fission fragments and gradual depletion of $U^{235}$ in the contact material. It is contemplated that the chemo-nuclear reactor may be operated while contact material is supplied to and withdrawn from the reactor in an essentially continuous manner. However, for most operations, complete change of contact material in the reactor may be made only during infrequent off-stream periods, or the contact material may be changed batchwise by withdrawing and replacing small portions of the reactor bed periodically during the reactant conversion period. During periods when contact material is not being charged to or discharged from the reactor 10, the plug valves 37, 38, 60 and 61 are in closed position, and an inert gas such as steam, helium, carbon dioxide, etc. is admitted to the lock chambers 90 and 53 via conduits 41 and 56, respectively. By means of control instruments 45 and 57, and pressure control valves 104 and 62 which are actuated thereby, the inert gas pressure in the closed lock sections 90 and 53 is maintained at about ¼ to ½ pound per square inch above that in the reactor 10, thereby preventing escape of reactants or other gases from the reactor via conduits 34 and 46. In this respect, the instrument systems 45 and 57 serve the function of differential pressure control instruments. When it becomes desirable to discharge contact material from the reactor 10, instrument system 57 is caused to change the setting of the three-way valve 55 so as to close off admission of inert gas via conduit 54 and to vent the gas from the lock chamber by vent 125. Thereafter, by means of suitable control instruments in system 57 which control the operation of drive mechanisms 110 and 115, valve 60 is caused to open for a measured time so that a portion of the mixed contact material and graphite pellets from reactor 10 flows into lock section 53. If desired, inert purge gas can be caused to enter the section 53 during this period so as to purge reactants from the contact material. Valve 60 is closed before the section 53 becomes filled with contact material. Valve 61 is then similarly caused to open, and the contact material falls from section 53 into the water pool 48. Thereafter, valve 61 is closed, and inert gas is again admitted to the lock section 53 so as to maintain the desired seal pressure therein. By a similar operation of lock section 90, fresh contact material mixed with graphite pellets is supplied onto the top of the bed 100 in order to replace the portion of the contact material which has been removed.

*Neutron moderators*

Instead of mixing separate particles of moderator with the particles of contact material in order to thermalize neutrons released by fission, moderator material such as graphite or beryllium oxide may be incorporated in the contact material particles during manufacture. In general, such material should have a capture cross-section for thermal neutrons less than about 0.2 barns and preferably less than about 100 millibarns. Alternatively, a portion of the reactor structural members may consist of graphite or beryllium or a compound of beryllium, or uniformly spaced rods or bars may be positioned across the portion of the reactor occupied by the contact material bed. Additional moderation may be obtained in some cases by employing water or heavy water as the heat exchange fluid circulated through the cooling tubes or jacket in the reactor. When the fluid reactant is a hydrogenous material such as hydrocarbons or hydrocarbon derivatives, the fluid reactant stream serves at least in part as the moderator. When the hydrocarbon reactant is in the liquid phase it is especially effective as a neutron moderator because of its increased concentration. Also, a moderating material such as heavy water or ordinary light water or hydrocarbons or hydrogen may be added to the fluid reactant stream to augment the moderator properties of the reactor system. It will be understood that the terms "effective moderator material" or "good moderator material" as used herein in describing and claiming this invention is intended to include carbon graphite, beryllium, beryllium oxide, heavy water, water, hydrogen, denterium, hydrocarbons and such other materials which have equivalent properties for thermalizing neutrons.

*Control of neutron flux*

Depending upon the condition of the contact material and desired severity of reaction and the rate of reactant flow through the reactor, it is necessary to adjust the neutrol flux in the contact material mass from time to time in order to promote fission of the fissionable material in the microporous solids at a rate at least sufficient to provide the energy required for the desired chemical conversion or transformation of the fluid reactants. The neutron flux in the mass may be controlled either by control of the number of free neutrons present or by control of the neutron speed by moderation. One way of adjusting the amount of moderator in the reactor is by controlling the amount of neutron moderating material in the fluid reactant feed and by controlling the rate of fluid reactant feed flow through the reactor. While it is undesirable to add to the feed materials having very high neutron capture cross-sections, it will be understood that frequently some components of the fluid feed stream may have higher neutron absorption capacities than others. Hence, to some extent, the neutron flux in the mass may be influenced by control of the amount of neutron absorbing material in the feed and the rate of feed flow through the conversion zone. In the system shown in FIGURE 1, the neutron flux may be adjusted by insertion into or withdrawal from the mass within the reactor of cadmium-containing or boron-containing control rods through suitable sheaths (not shown). Alternatively, the neutron flux in the contact mass may be controlled by regulating the thermal neutron flux in the region in which the reactor 10 is located. Thus, where the reactor is positioned in a graphite-filled region adjacent the nuclear reactor core, cadmium-containing or boron-containing control rods may be inserted into or withdrawn from the graphite blanket at points around the reactor 10. Two such rods 111 and 112 may be seen in the drawing.

*Alternative arrangements*

As indicated above, when the mass of contact material in the reactor is itself incapable of effecting a self-sustaining, neutron-multiplying reaction, an atomic reactor is the preferred outside source of neutron supply. However, it is contemplated that neutrons may be supplied by other means, for example, the provision around the outside or inside of the reactor of suitably clad capsules or members containing a mixture of metallic beryllium and an alpha particle emitter such as radium or a polonium compound such as radium or radon. Other possible neutron sources are antimony containing 60-day Sb-124 surrounded by metallic beryllium, or a mixture of Pu239 and beryllium.

While, in the arrangement of FIGURE 1, only a single reactor tube of relatively small diameter, surrounded by a cooling jacket, is shown, modified arrangements are contemplated for reactors of greater capacity. For example, large reactors may take the form of a tube and shell type vessel with the contact material positioned either inside or outside of the tubes while the liquid heat transfer fluid is circulated through or around the opposite sides of the tubes. In arrangements of this type, the external neutron source may be desirably positioned within the reactor shell, either within or without the tubes therein, in order to provide uniform neutron flux in all portions of the contact material mass.

In other alternative arrangements, provision for cooling or heating the contact material mass by indirect heat transfer may be omitted in whole or in part and the rate of fluid reactant flow through the mass and the inlet temperature thereof may be regulated to effect in whole or in part, heating when necessary and more frequently removal of excess fission energy from the mass as increased sensible heat in the conversion product stream. This may be accomplished by diluting the fluid reactant stream with a suitable heat carrying fluid which is of low neutron capture cross-section and which may be essentially inert under reactor conditions or by recycling unconverted reactant (in this case, methane) from the product recovery system 83 to the reactor via conduit 84, compressor 65 and conduit 66. If desired, a portion of the total cooled reaction product stream withdrawn from exchanger 78 may be bypassed around the product recovery system 83 and recycled to the reactor 10. In this manner, the temperature of the mass 100 may be controlled, and, at the same time, the concentration of desired products in the portion of the product stream supplied to the product recovery system 83 may in some cases be increased.

Beyond the limit of providing sufficient fission in the microporous solids to effect the desired chemical conversion of the fluid reactants, the thermal energy released in the reactor 10 may be controlled by control of the neutron flux maintained in the contact material mass. As indicated above, this can be accomplished by adjustment of control rods 111 and 112.

In general, only a relatively small fraction of the kinetic energy of the fission fragments released upon fission of the fissionable material in the microporous solids is ultimately converted to chemical energy, and the remainder is converted into thermal energy. It is, therefore, very desirable from the standpoint of overall economics of the system to recover the excess energy from the fission fragments which has not been converted to chemical energy in a form which can be converted to power as shown hereinabove in connection with exchangers 29 and 78.

In order to prevent contamination of the microporous contact material with materials having a high neutron capture cross-section such as boron, cadmium, antimony, cobalt, lithium, etc., the fluid reactant feed should be treated, if necessary, to remove such materials prior to passage through the reactor. Usually, it is preferred also to exclude sulfur and nitrogen and compounds thereof, except in the case of certain chemical conversions necessarily involving these materials.

FIGURE 2

Figure 2:
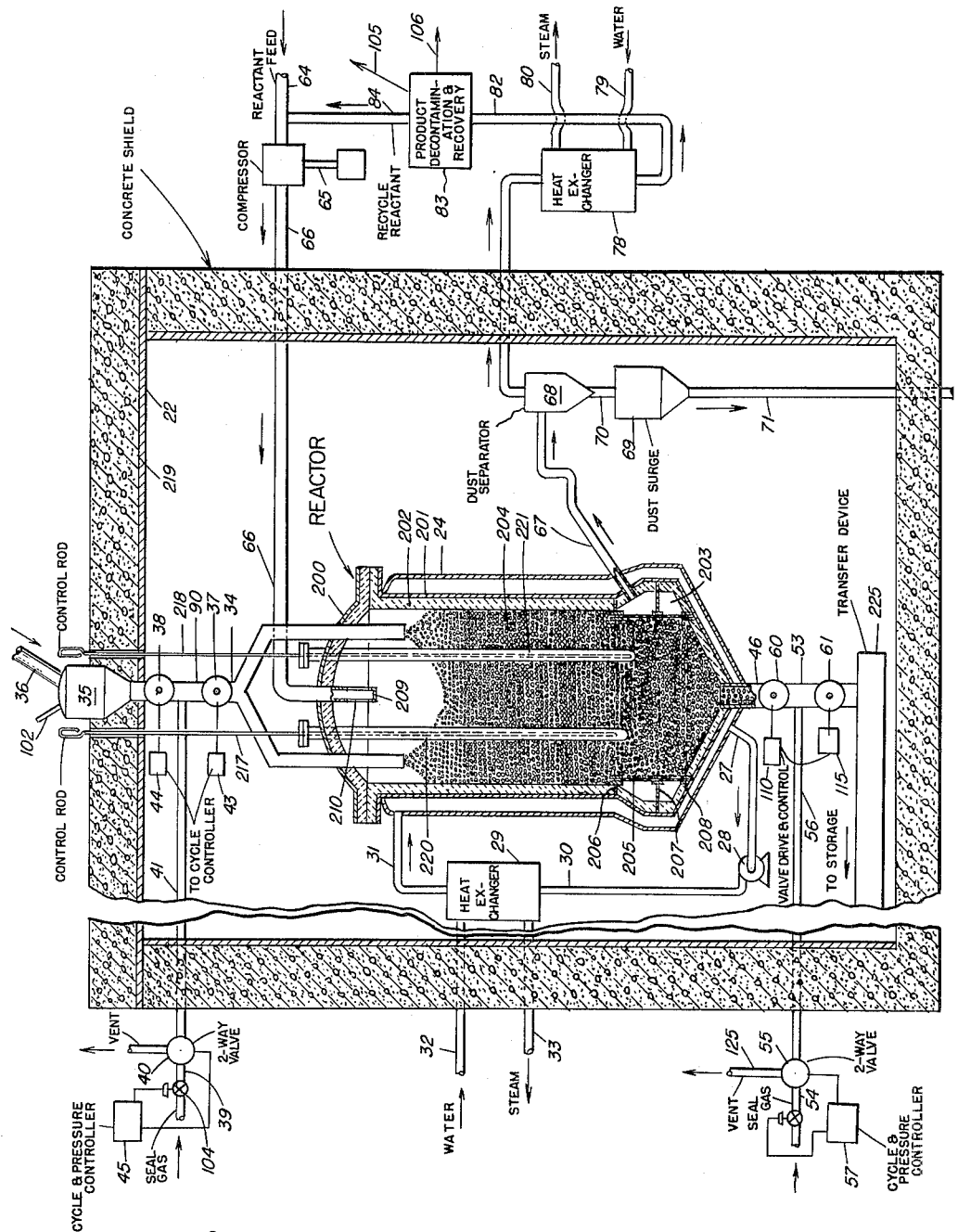
FIGURE 2 is an elevation view, partially in section, of a modified arrangement according to this invention in which the chemo-nuclear reactor is capable of maintaining a self-sustaining, neutron-multiplying fission reaction.

Referring now to FIGURE 2, there is shown a modified chemo-nuclear reaction system in which the geometry of the reactor and contact material mass and the concentration of fissionable material are such as to render the mass capable of effecting a self-sustaining, neutron fission reaction. Suitable moderation of the neutrons released by fission being provided, an outside source of neutrons is not required for operation of this system other than as an aid in its start-up. By way of example, for cracking of normal decane at 500° F. and 5 p.s.i.g., the contact material may consist of ¼ inch average diameter silica-alumina gel tablets shaped to provide a weighted volume distance from within the particles to the nearest surface in excess of 1,500 microns. The microporous tablets may contain 40% by weight of uranium which has been enriched to 40% $U^{235}$ content. The size of the mass is such that there is about 6 kilograms of $U^{235}$ in the total mass.

The reactor 200 has a stainless steel shell 201 and jacket 24 and an internal lining of beryllium oxide 202 which acts as a neutron reflector. The lower section of the reactor is expanded in cross-section to provide an annular reactant withdrawal space 203 which is separated from the critical mass of contact material 204 by a ring-shaped screen or perforated plate baffle 205. The baffle 205 is fastened to the vessel shell by suitable braces shown at 206, 207 and 208. The jacket heat exchange system, the fluid reactant feed arrangement and product recovery system and the means for adding contact material to the reactor and withdrawing contact material therefrom are all similar to those shown in FIGURE 1 and bear like legends. These features require no further description other than mention of points of minor difference. The reactant manifolding differs from that shown in FIGURE 1, principally in providing for downward flow of reactant fluid through the bed 204 rather than upward flow. This permits somewhat higher reactant throughput velocities without disturbance of the contact material bed. The fluid inlet conduit 66 is closed on its end 209 within the reactor, and lateral openings 210 are provided so that entering vapors do not impinge directly down onto the bed surface. While the arrangement shown may be employed for liquid phase operations, it is preferred for vapor phase operations, it will be understood that, for liquid phase operations, somewhat modified arrangements may be provided for distribution of the liquid feed onto the bed 204 and for withdrawal of liquid products therefrom. Such modified arrangements are well known to those familiar with design and operation of reactors adapted for contacting of liquid reactants with beds of particle form contact materials. The same is true of the equipment employed for separation of entrained dust from fluid conversion products.

A plurality of control rod sheaths, of which two are shown at 220 and 221, connect through the top of reactor 200 and depend down into the reactor. Cadmium- or boron-containing control rods 217 and 218 may be inserted or withdrawn from these sheaths from a location outside the biological shield 219. It will be noted that the biological shield 219 encloses the reactor, jacket exchanger and product dust separation system. If desired, the exchanger 78 may also be positioned within the shielded area, and a normally liquid primary cooling fluid may be substituted for water in this exchanger. In this case, the primary cooling fluid from exchanger 78 is circulated to a secondary exchanger or boiler, not shown, in which heat removed from the conversion product is exchanged with boiler feed water.

Suitable contact material storage tanks, not shown, may also be provided within the shielded area for storage of the contact material when the reactor 200 is not in use. These tanks should be of such limited size and suitably separated from each other as to permit storage of the contact material without danger of self-sustaining fission reaction occurring. A suitable contact material transfer system 225 is connected to the discharge end of conduit 46 for transfer of discharged contact material to the storage tanks.

FIGURE 2 operation

In operation of the system shown in FIGURE 2, the mass of contact material 204 becomes critical or supercritical upon withdrawal of a suitable number of control rods 217 and 218. The extent of the fission reaction may be regulated by means of the control rods, and the fission reaction may be stopped by inserting a sufficient number of the rods into the sheaths 220 and 221. The neutrons released by the fission reaction may be moderated by any of the methods discussed hereinabove in connection with FIGURE 1, for example, in part by the contact material itself and in part by constituents of the fluid reactant stream. Thus the neutron flux and the amount of fission may be controlled at least in part by regulation of the amount of neutron moderating material in the confined reaction zone. The neutron flux in the mass 204 is maintained usually in the range $10^{12}$–$10^{13}$ neutrons per square centimeter per second.

In the arrangement shown in FIGURE 2, the temperature in the mass 204 is controlled at the desired level principally by recycling fluid reactant, cooled to a temperature substantially below the desired conversion temperature, and controlling the total rate of reactant flow through the reactor. A minor portion of the excess thermal energy may be removed by means of the jacket heat exchange system. It is also contemplated that heat transfer tubes may be provided inside the reactor to remove most or all of the excess energy released by the fission reaction. In one modification of this general type, the chamber portion of the reactor system may be in the form of a graphite block having a plurality of laterally spaced passages extending verticaly therethrough, in which the contact material is placed, and a second plurality of interconnected passages extending within the block between the first-mentioned passages for circulation of the heat transfer fluid. The graphite employed for this purpose should be treated to render it impervious to the reactant fluids which are to be converted. The graphite also serves as a moderator in this arrangement.

*Alternative arrangement*

In the alternative operation of the system shown in FIGURES 1 and 2, the geometry of the contact material mass and concentration of fissionable material therein may be such as to render the mass capable of effecting only a subcritical neutron-multiplying reaction and removable rods or strips containing a high concentration of fissionable material may be inserted into the mass when desired to render the entire assembly, including the rods, critical, whereby a self sustaining, neutron-multiplying reaction is effected in the chemo-nuclear reactor. Such rods may be adjustably inserted into sheaths such as those shown at 220 and 221 in FIGURE 2 and may be removed when it is desired to stop the fission reaction, the rods in themselves being incapable of sustaining a self-supporting, neutron-multiplying reaction.

It will be understood that suitable heat-insulating material may be provided around the shells of the chemo-nuclear reactors shown in FIGURES 1 and 2 when chemical reactions are conducted therein at temperatures substantially above or below atmospheric temperatures.

*Applications of invention*

The method of the present invention is broadly useful in the conduct of a very large number of chemical conversions and transformations of different types. In general, the invention is applicable to chemical conversions or transformations of fluid reactants (i.e., liquid or gaseous reactants) to products which are at least mostly fluid and are of different chemical composition, which conversions or transformations require supply of substantial amounts of energy. It should be understood that reference herein, in describing and claiming this invention, to conversions or transformations which "require supply of substantial amounts of energy" is intended to mean:

(A) Chemical conversions or transformations which can be effected only by supply of a substantial quantity of free energy. This includes highly endothermic reactions among certain others.

(B) Conversions or transformations not requiring supply of a substantial quantity of free energy but requiring supply of a substantial quantity of activation energy in order to effect their progress.

The invention is not particularly useful for the conversion of reactants which are and remain solids under the conversion conditions, nor is it particularly useful for those fluid conversions which, under the conditions employed, cause very rapid deposition on the microporous solids of materials which permanently clog the pores of the contact material so as to prevent successful use of the microporous solids over practical operating periods. Also, where the conversion may be started and will continue idefinitely spontaneously or upon supply of only small amounts of energy, the use of the present invention is unnecessary. The uncontrolled combustion by burning of gaseous and light liquid hydrocarbon fuels is an example of the latter type of conversion. Usually, the invention would not be employed for strongly exothermic chemical reactions except in those cases where the reaction will not initiate except upon supply of a substantial quantity of initial energy. For practical reasons, the invention is not applicable to conversions in which the reactants have thermal neutron capture cross-sections above about 2 barns.

Reactant feeds which or feeds leading to conversion products which, under the process conditions, cause serious permanent impairment of those properties of the contact material which render it useful for the chemo-nuclear process, or which remove or cause removal from the porous contact material by solubilizing or leaching of contained catalytic compounds or of fissionable material or of the retained normally solid fission products are generally not employed in the process of this invention, except in such cases where the solubilizing or leaching action is specifically desired. In some cases specific reactants may be objectionable only in the case of certain contact materials, for example, water and water vapor at high temperatures would react with an activated carbon but would not be objectionable where the porous carrier material is pumice, for example. It is necessary to exclude chlorine and compounds thereof where the contact material contains aluminum, iron chromium and uranium and the operating conditions would be such that volatile chlorides of these metals would be formed.

Examples of a large number of chemical reactions which may be caused to occur by subjection of the reactants, either in the presence or absence of porous or catalytic solid materials, to irridiation by alpha particles, neutrons, beta rays or electromagnetic gamma radiations have been disclosed in prior art cited hereinabove. Similarly, examples of chemical reactions which may be caused to occur in the presence of nuclear fission fragments, either in the presence or absence of porous contact materials, have also been disclosed in some of the prior art references hereinabove referred to. Within the limits of the applicability of this invention outlined in the two paragraphs next above, the method of the present invention may be applied to the many different chemical conversions described in the above-mentioned prior art with the resultant advantages which have been indicated herein to be derivable from this invention. Other chemical conversions and transformations to which this invention is applicable and the types of porous contact materials which may be used in that connection have been specifically mentioned hereinabove in connection with the discussion of the microporous carrier material and of compounds which may be added to said carrier for the purpose of providing beneficial catalytic influence on the chemical reactions involved. Without any intention of limiting the scope of the invention thereto, some typical chemical conversions to which the method of the present invention may be beneficially applied and which appear worthy of further mention are listed hereinbelow:

(A) Chemical reactions of the type wherein a carbon-hydrogen, carbon-carbon or other chemical bond is ruptured with resultant formation of molecular fragments which recombine to form dimers; for example, the conversions of methanol to diethylene glycol and hydrogen over a microporous, fissionable material carrier such as pumice, kieselguhr, diatomaceous earth or silica gel. Temperatures employed in the chemo-nuclear reactor may be of the order of 50 to 200° F., and pressures may range from atmospheric to 200 p.s.i.g. Another reaction of this type is the conversion of monocarboxylic acids to dicarboxylic acids.

(B) Reactions between dissimilar organic compounds wherein fragmentation of the molecules of each compound occurs and these fragments may combine with like or dissimilar fragments to produce a mixture of products. An example of such a reaction is the conversion of an ethanol-hexane mixture to butanediols, octanols and dodecanes. The fissionable material carrier in this case may be pumice, kieselguhr or silica gel, and conditions in the chemo-nuclear reactor may include temperatures in the range of 50 to 200° F. and pressure of the order of atmospheric to 10 atmospheres.

(C) Synthesis reactions, for example, the conversion of nitrogen and oxygen to oxides thereof at 200 to 400° F. and 5 to 20 atmospheres, in the presence of a fissionable material carrier comprising silica gel. Another example is the synthesis of ammonia from nitrogen and hydrogen over a contact material prepared by coprecipitating hydroxides of uranium, iron and of smaller amounts of aluminum from nitrate solutions thereof with ammonium hydroxide, washing, mixing with kieselguhr, forming, drying and calcining; then impregnating the whole with promoter amounts of postassium. The contact material is subjected to a reduction atmosphere by contacting with a rapid stream of hydrogen at 800–950° F. until the dew point of the hydrogen is about 30° F. Operating temperatures and pressures are somewhat lower than those employed in the art for effecting this conversion by ordinary catalysis. Another example is the synthesis of methane from carbon monoxide and hydrogen over alumina containing nickel and uranium. Such contact material is prepared by impregnating microporous alumina or active carbon particles of suitable size and shape with a soluble uranyl salt enriched in U-235 such as the acetate or nitrate, followed by immersion in cold, saturated, aqueous ammonium hydroxide solution to fix the uranium as ammonium diuranate. The particles are dryed and heated in a nitrogen stream to decompose the diuranate and the resulting oxide is reduced to the dioxide by continuing the heating in a nitrogen stream at 800–950° F. until the dew point of the hydrogen is about 30° F. The particles are then impregnated with nickel nitrate, followed by heating to decompose the nitrate and then heated in a hydrogen stream to reduce the nickel. The chemo-nuclear conversion is conducted at 100–300° F. and 1–10 atmospheres. Operating conditions for the chemo-nuclear conversion include temperatures in the range of 200 to 600° F. and pressures in the range of 1 to 20 atmospheres.

(D) Decomposition of stable compounds, for example, decomposition of carbon dioxide to form carbon monoxide and oxygen in the presence of a fissionable material carrier comprising pumice or silica gel and in the presence of small quantities of added nitrogen dioxide. Moderate conditions of temperature and pressure may be employed in the chemo-nuclear reaction zone. Another example of this type is the radio-catalytic decomposition of methane or other simple hydrocarbon gases to form hydrogen and hydrocarbons of higher molecular weight, usually those having from 2 to 6 carbon atoms per molecule. This conversion may be conducted over microporous alumina containing fissionable material in the concentrations disclosed herein at temperatures in the range of 50 to 400° F. and pressures in the range of 5 to 15 atmospheres. Another reaction of this general type is the decomposition of water in the presence of microporous solids containing fissionable material.

(E) Hydrogenation of hydrocarbons and other organic compounds and sulfur compounds. As an example, olefinic gasoline may be hydrogenated over a catalyst comprising alumina impregnated with nickel or platinum and containing suitable quantities of fissionable material. Temperatures for this conversion are in the range of 0 to to 800° F., pressures in the range of 50 to 500 p.s.i.g. and space velocities in the range of 0.05 to 30 volumes of liquid feed measured at 60° F. per volume of contact material per hour. Hydrogen or hydrogen-containing gases are added with the hydrocarbon feed.

(F) Hydrogenation of hydrocarbons, for example, the dehydrogenation of butane to butylenes, of naphthenes to aromatics or of paraffinic hydrocarbons in the gasoline boiling range to olefinic hydrocarbons over platinum or chromia on alumina containing halogen and containing suitable quantities of fissionable material or over platinum or chromia on silica alumina at temperatures in the range of 0 to 800° F., pressures in the range of 0 to 500 p.s.i.g. and space velocities in the range of 0.1 to 30 volumes of liquid feed (measured at 60° F.) per volume of contact material per hour. Hydrocarbon gases may be added with the hydrocarbon feed.

(G) Aromatization of paraffinic hydrocarbons over such contact materials as platinum on charcoal or platinum on alumina containing halogen and containing fissionable material in the presence of hydrogen and at temperatures in the range of 400 to 1,000° F., pressures in the range of atmospheric to 1,000 p.s.i.g. and space velocities in the range of 0.05 to 40.

(H) Dealkylation or demethylation of alkyl aromatic hydrocarbons, for example, demethylation of toluene to form benzene over microporous silica alumina contact material or alumina impregnated with chromia and containing fissionable material in the presence or absence of added free hydrogen and at temperatures in the range of 300 to 1,000° F., pressures in the range of atmospheric to 1,000 p.s.i.g. and space velocities in the range of 0.05 to 40.

(I) Alkylation of hydrocarbons, for example, the alkylation of aromatic compounds such as benzene, naphthalene, anthracene, phenols and chloroalkyl or nitro aromatics by contact with alcohols, olefins and alkyl chlorides. Such conversions may be effected in the presence of alumina, pumice or kieselguhr impregnated with aluminum chloride and fissionable material at temperatures in the range of 70 to 350° F. and moderate pressures. Another example is alkylation of isobutane-butylene mixtures over microporous alumina impregnated with aluminum chloride and fissionable material at temperatures in the range of —50 to 1,000° F. and at moderate pressures.

(J) Hydrocracking of petroleum hydrocarbons, particularly those boiling above gasoline. Such reactions are conducted in the presence of a microporous material such as alumina impregnated with platinum and containing halogen and in the presence of added hydrogen at temperatures in the range of 400 to 1,000° F. and pressures in the range of 50 to 1,500 p.s.i.g. and space velocities in range 0.05–40.

(K) Non-hydrogenative cracking of petroleum hydrocarbons, particularly those boiling above gasoline, over alumina or silica-alumina microporous materials impregnated with fissionable materials. Conversion conditions are temperatures in the range of 400 to 1,200° F., pressures in the range of atmospheric to 500 p.s.i.g. and space velocities in the range of 0.05 to 40. For example, a petroleum gas oil fraction boiling within the range about 400–900° F. or a pure hydrocarbon such as normal-decane may be contacted at 400–600° F., 1–3 atmospheres pressure and space velocity 0.5–10 liquid volumes measured at 60° F. for volume of contact material per hour with a bed of microporous silica-alumina catalyst containing about 4 to 20% uranium which has been about 30–60 enriched in U-235. The bed which may be similar to that shown in FIGURE 1 may be placed in the blanket area of a nuclear reactor where the neutron flux will be about $5 \times 10^{13}$ neutrons per second per square centimeter. The hydrocarbon material is cracked to lower molecular weight hydrocarbons. The silica-alumina carrier material may be in the form of particles having nominal diameters within the range about 700 to 5,000 microns, Y values well in excess of 100 microns, loose bulk density of about 45 pounds per cubic foot, pore volume 35–50%, average pore diameter in range 60–100 microns and surface area in range 200–300 square meters per gram.

(L) Isomerization of paraffins and cycloparaffins over alumina or silica-alumina containing finely dispersed fissionable material at temperatures in the range of 200 to 1,000° F., pressures in the range of atmospheric to 1,000 p.s.i.g. and space velocities in the range of 0.05 to 40.

(M) Partial oxidation reactions, for example, conversion of propane with controlled amounts of air or oxygen to alcohols, aldehydes, ketones and acids over microporous active charcoal which has been impregnated with copper oxide and tungsten oxide mixtures and with fissionable materials at temperatures in the range of 50 to 800° F. and pressures in the range of 1 to 100 atmospheres. Another example is the conversion of liquid or gaseous hydrocarbons such as propane in the presence of water to synthesis gas (carbon monoxide and hydrogen) over such microporous contact materials as alumina or graphite impregnated with nickel and with fissionable material. The method for preparing this contact material is discussed in paragraph C. Such conversions are conducted at temperatures in the range of 200 to 1,000° F. and pressures in the range of 5 to 1,000 p.s.i.g., with residence times in the contact mass in the range of 0.1 to 60 seconds.

(N) Dehydration reactions such as the dehydration of ethyl alcohol over microporous alumina containing the uranium or other fissionable material at temperatures in the range of 200–600° F. and moderate pressures, with resultant formation of ethylene.

*Further example*

In further illustration and example of the application of the method of this invention, reference may be made to the conversion of a mixture of steam and propane vapor to carbon monoxide and hydrogen, which is a reaction requiring supply of a substantial amount of free energy. A reactor of the type shown in FIGURE 2 is employed. A reactor vessel having a cylindrical bed 30 centimeters in diameter and 270 cm. long is employed. The bed contains about 141,600 cubic centimeters of spherical pellets of alumina impregnated with nickel and uranium and about 28,000 cubic centimeters of spherical graphite pellets of approximately the same size as the alumina pellets and uniformly mixed therewith. The contact material is prepared by mixing measured amounts of aqueous aluminum chloride solution and uranyl nitrate solution followed by adding to this solution sufficient concentrated ammonium hydroxide to bring the pH of the final mixture to about 8.5, whereupon aluminum and uranium are precipitated. The precipitate is filtered, washed with dilute ammonium hydroxide solution, and then the wet precipitate is impregnated with a measured quantity of nickel nitrate. Thereafter, the material is slowly heated in air for several hours at 200 to 300° F. to dry. Spherical pellets of contact material are formed from a paste of the dried material. The pellets are dried, calcined in air for about 12 hours at 1,200° F. and then reduced by heating at 800–950° F., in a stream of hydrogen until the dew point of the exit hydrogen is not higher than 30° F. The resulting contact material is composed of particles of alumina bearing about 5% by weight nickel and 8.4% by weight of uranium which has been 50% enriched so that the U–235 content of the particles is about 4.2% by weight. The total amount of U–235 in the bed is 6,000 grams. The contact material particles have an average nominal diameter of about 2 millimeters, and the average weighted volume distance from within the particles to the nearest surface thereof is about 335 microns. The apparent bulk density of the contact material (unpacked) is about 62.5 pounds per cubic foot and the true density of the solids in the particle is about 4.0. The surface area of the contact material is about 300 square meters per gram, and the pore volume is about 50% of the total particle volume. The micropore volume is about 90% of the total pore volume. The critical Y value for this contact material calculated by the equation presented herein is about 53 microns. A reactant feed stream consisting of about 80 mole percent steam and 20 mole percent propane is preheated to 800–1,000° F. and passed through the contact mass at a rate of about 350 grams of propane per minute. The pressure in the conversion zone is maintained at about 5 p.s.i.g. The mass 204 in the reactor 200 contains sufficient U–235 and other conditions in the reactor are such, including suitable neutron moderation by the graphite spheres, the alumina carrier material and the reactants, that a self sustaining neutron multiplying fission reaction can be maintained therein. The neutron flux in the mass and the amount of fission reaction occurring is controlled by adjustable cadmium-containing control rods 217 and 218 so that sufficient energy is released for effecting the chemical reaction. The neutron flux is maintained at about $10^{13}$ neutrons per square centimeter per second. The temperature of the mass is maintained within the range 800 to 1,000° F. by removing therefrom any excess heat released by fission or by chemical reaction by recycling to the reactor of unconverted reactant material recovered from the conversion products and adjusting the inlet temperature of the reactant feed. This heat is recovered from the product stream in exchanger 78 and used in manner hereinabove discussed. Radiation heat losses are counteracted by circulation of superheated steam through the jacket 24. The products from the conversion contain carbon monoxide, hydrogen, unconverted propane, and some carbon dioxide and hydrocarbons of both lower and higher molecular weight than propane. Unconverted propane is separated from the product material and recycled to the conversion zone with the proper proportion of added steam.

If desired, the reactor in the above example can be operated as a subcritical reactor by insertion of sufficient control rods to maintain the mass in the subcritical region and adding neutrons to the mass from an outside source at a rate controlled to provide sufficient fission to effect the chemical conversion. In this case the neutron flux in the reactor may be maintained at about $1 \times 10^{13}$ neutrons per square centimeter per second and the number of control rods in the mass is regulated to maintain the ratio of neutrons existing in the daughter generation to the number of neutrons existing in the parent generation at a selected value above 0.95 but below 1.0.

*General operating conditions*

Operating conditions employed in the conversion zone in the method of this invention may vary over a broad range, depending upon the particular chemical conversion involved. In general, temperatures within the contact mass should be sufficiently high for progress of the chemical conversion at a practical rate and yet below a level which would cause serious heat damage to the porous contact material as a result of sintering, change in crystalline structure of one or more of its components or other reasons. The required conversion temperature and other conditions affecting reaction severity will be more moderate than is the case in the absence of the fission product radiation. Generally, the selected contact mass temperature will fall within the range of about −50 to 1,200° F., pressure within the range of subatmospheric to about 100 atmospheres and reactant residence time in the contact mass from about one-half second to about 50 hours, and preferably one second to 4 hours. The thermal neutron flux in the contact mass will fall within the range of about $10^{11}$ to $10^{14}$ per square centimeters per second.

It should be understood that the specific examples of operating conditions and methods, apparatus arrangement and applications of the invention described herein are exemplary in character and are not to be construed as limiting the scope of the invention thereto unless so stated.

I claim:

1. A method for utilizing the energy of the fission fragments from nuclear fission of fissionable material for the conduct of chemical conversions of fluid reactants to fluid products of different composition, which conversions require supply of substantial amounts of energy, which method comprises contacting the fluid reactant feed material in a confined zone with a mass of porous contact material made up of at least one body of porous, inorganic, solid material containing dispersed fissionable material in sufficient concentration to render said mass, in its environment in said zone under the chemical conversion conditions, including suitable neutron moderation and in the presence of suitable neutron flux, capable of effecting a neutron-multiplying fission reaction, maintaining a neutron flux in said mass and moderating the neutrons in said mass, whereby neutron-multiplying fission of said fissionable material occurs, said body of porous contact material having porosity characteristics adapted to permit escape of gaseous fission products and to permit ingress and egress of fluid reactant, controlling the neutron flux to promote fission at a rate at least sufficient to supply the energy required for effecting the conversion of said fluid reactant material to the desired products, the size and shape of each body making up said mass being maintained such as will insure initial retention within the body of substantially all of the normally solid fragments of said fission and separating fluid products of said conversion from said contact material.

2. A method for effecting chemical conversion of fluid reactants to products of different chemical composition, the conduct of which conversions requires the supply of substantial amounts of energy, which method comprises contacting fluid reactant feed material with a microporous, particle-form contact material containing sufficient fissionable material substantially uniformly distributed therethrough to render an aggregate of said contact material capable of effecting a self-sustaining nuclear fission reaction, maintaining the microporous particles of contact material having porosity characteristics adapted to permit ingress and egress of fluid reactants, a neutron flux in said contact material to cause fission of said fissionable material at a rate suitable for providing the energy required for effecting the conversion of said fluid reactant material to the desired products, said contact material being made up of particles having an average weighted volume distance from within all portions thereof containing fissionable material to their nearest external surface, (Y), greater than that expressed by the equation, $$Y = \frac{10}{3}\left(\frac{500}{(1-P)d_s + Pd_r}\right)^{1/2}$$

where Y is expressed in microns, P is the volumetric fraction of pores in the particles, $d_s$ is the true density of the solid material in grams per cc. and $d_r$ is the density in grams per cc. of the reactant in the particle pores under the conversion conditions, whereby substantially all of the normally solid fragments of said fission are initially retained in the contact material particles, removing excess fission heat from said mass to maintain the temperature therein below a heat-damaging level, and separating the products of said reactant conversion from said contact material.

3. A method according to claim 2 further characterized in that the particles of said microporous contact material have a surface area within the range of 5 to 1,500 square meters per gram.

4. A method for utilizing the energy of the heavy fission fragments from nuclear fission of fissionable material for the conduct of chemical conversion of fluid reactants to fluid products of different composition, which conversion requires supply of substantial amounts of energy, which method comprises: contacting the fluid reactant feed material in a confined zone with a mass of microporous contact material made up of particles having a surface area within the range of about 5 to 1,500 square meters per gram and pores falling principally in the range of about 4 to 100 angstroms radius, said contact material particles having fissionable material substantially uniformly dispersed throughout at least portions thereof, including at least some portions adjacent external surfaces thereof, said fissionable material being in grain size less than 6 microns and in sufficient concentration to render said mass, in its environment in said zone under conversion conditions, including suitable neutron moderation, capable of effecting a neutron multiplying fission reaction when a suitable neutron flux is present in said mass, maintaining a neutron flux in said contact material mass and moderating the neutrons whereby neutron-multiplying fission of the fissionable material occurs, with resultant release of heavy fission fragments of high kinetic energy within said particles, whereby said chemical conversion of said fluid reactant feed is effected with concurrent transformation of some of the kinetic energy in the heavy fragments from the said fission reaction to chemical energy, maintaining said mass at a suitable temperature level for said chemical conversion and below a temperature which would cause rapid heat damage to the microporous particles at least in part by removing excess fission energy from said mass as thermal energy and separating the fluid products of said chemical conversion from said contact material; said contact material being further characterized in that the average weighted volume distance from within all portions of said particles containing said fissionable material to the nearest external surface of said particles, (Y), is greater than that expressed by the equation, $$Y = \frac{10}{3}\left(\frac{500}{(1-P)d_s + Pd_r}\right)^{1/2}$$

where Y is expressed in microns, P is the volumetric fraction of pores in the particles, $d_s$ is the true density in grams per cc. of the solid material, and $d_r$ is the density in grams per cc. of the reactant in the particle pores under the conversion conditions, whereby substantially all of the normally solid fragments from said fission reaction are initially retained within said particles, permitting separation of said fluid reaction products therefrom by separation from said contact mass.

5. A method according to claim 4 further characterized in that said contact material is made up of spheroidal particles having nominal diameters within the range of about one-eighth to one-half inch.

6. A method according to claim 4 further characterized in that said contact material is made up of pellets having nominal diameters within the range of about one-eighth to one-half inch and having maximum transverse dimensions not more than five times the minimum transverse dimensions.

7. A method according to claim 4 further characterized in that said fissionable material is at least one of the isotopes selected from the group consisting of uranium-235, uranium-233 and plutonium-239.

8. A method according to claim 4 further characterized in that said mass of contact material comprises a portion of the fuel mass in an atomic reactor which is capable of effecting self-sustaining, neutron-multiplying, nuclear fission reaction, said contact material being confined out of fluid communication with the remainder of the fuel mass but being in gamma and neutron radiation communication therewith.

9. A method according to claim 4 further characterized in that the temperature within said contact mass is regulated in part by control of the intensity of neutron flux maintained in said mass.

10. A method for utilizing the energy of fission fragments from nuclear fission of fissionable material for the conduct of chemical conversion of fluid reactants to fluid products of different composition, which conversion requires supply of substantial amounts of energy, which method comprises: maintaining in a confined conversion zone a mass of particle form, a microporous, solid contact material made up of particles having porosity characteristics adapted to permit ingress and egress of the fluid reactants and containing fissionable material dispersed substantially uniformly throughout at least portions thereof, including at least some portions adjacent the external surfaces of said particles, the amount of said contact material and the fissionable material therein being sufficient, under the conditions in said zone during chemical conversion, including the presence of suitable neutron moderation, to effect a self-sustaining, neutron-multiplying, nuclear fission reaction of at least critical intensity, said particles of contact material being sized and shaped to provide an average weighted volume distance from within said particles to the nearest surface thereof, (Y), in excess of that expressed by the equation $$Y = \frac{10}{3}\left(\frac{500}{(1-P)d_s + Pd_r}\right)^{1/2}$$

whereby substantially all of the normally solid fragments resulting from said nuclear fission reaction are initially retained within said particles, passing fluid reactant feed through said confined zone into contact with said contact material while said nuclear fission reaction is in progress, whereby a portion of the energy released thereby is made available for effecting conversion of said fluid reactant feed to a fluid reactant product of different composition, withdrawing said fluid reactant product from said confined zone, regulating the content of neutron-moderating and absorbing material in said fluid reactant feed and its rate of passage through said confined zone to maintain said neutron-multiplying, nuclear fission reaction at least critical and controlling the neutron flux in said contact material to cause fission of said fissionable material at a rate sufficient to supply the energy required for effecting said chemical conversion of said fluid reactant feed but insufficient to cause serious heat damage to said contact material and controlling the temperature within said zone at a level suitable for the desired chemical conversion of said fluid reactant at least in part by removing excess fission energy from said mass in the form of thermal energy.

11. A method according to claim 10 further characterized in that said fluid reactant product is withdrawn from said confined zone separately of said contact material, and used contact material containing said normally solid fission fragments is separately withdrawn from said zone at least periodically, and fresh contact material is supplied to said zone at least periodically to replenish said mass of contact material therein.

12. A microporous contact material for carrying out chemical reactions comprising particles of a solid inorganic carrier having a surface area within the range of about 5 to 1,500 square meters per gram and a pore volume of 5 to 70% of the total particle volume, said pores having a radius in the range of about 4 angstroms to 100 microns, said particles having a nominal diameter of 150 microns to one inch and a maximum transverse dimension not more than five times the minimum transverse dimension, said particles having dispersed therein fissionable material of a grain size of less than 6 microns and in sufficient concentration to render said contact material capable of effecting a neutron-multiplying fission reaction in the presence of a suitable neutron flux, said contact material having a density in the range of 1.8 to 4.0 grams per cc., said contact material being further characterized by the formation therein of active contact sites by virtue of the transfer of energy thereto from high energy normally solid fission fragments formed during said fission reaction, said contact sites being adapted to transfer energy to fluid chemical reactants disposed in said pores, and the size, shape, and porosity of said particles and density of said contact material being correlated to enable the particles to retain therein substantially all of said normally solid fission fragments.

13. A microporous contact material according to claim 12 further characterized by incorporating a solid neutron moderator material.

14. A microporous contact material for carrying out chemical reactions comprising particles of a solid inorganic carrier having a surface area within the range of about 5 to 1,500 square meters per gram and pores of a radius in the range of about 4 angstroms to 100 microns, said particles having a nominal diameter of about one-eighth to one-half inch and a maximum transverse dimension not more than five times the minimum transverse dimension, said particles having dispersed therein fissionable material in sufficient concentration to render said contact material capable of effecting a neutron-multiplying fission reaction in the presence of a suitable neutron flux, said contact material being characterized by the ability to transfer energy from high energy normally solid fission fragments formed during fission to fluid chemical reactants disposed in said pores, and the size, shape, and porosity of said particles being correlated to enable the latter to retain therein substantially all of said normally solid fission fragments.

15. A microporous contact material for carrying out chemical reactions involving chemical reactants disposable in the pores of said material, said contact material being made up of particles of a solid inorganic carrier having a surface area within the range of about 5 to 1,500 square meters per gram and pores of a radius in the range of about 4 angstroms to 100 microns, said particles having dispersed therein fissionable material of a grain size of less than 6 microns and in sufficient concentration to render said contact material capable of effecting a neutron-multiplying fission reaction in the presence of a suitable neutron flux, said contact material being characterized in that the average weighed volume distance (Y) from within fissionable material-containing portions of said particles to the nearest external surface of said particles is greater than expressed by the equation, $$Y = \frac{10}{3}\left(\frac{500}{(1-P)d_s + Pd_r}\right)^{0.5}$$

where Y is in microns, P is the volumetric fraction of pores in the particles, $d_s$ is the true density in grams per cc. of the solid material, and $d_r$ is the density in grams per cc. of the reactant in the particle pores under the conversion conditions, and said contact material being further characterized by retaining in said particles substantially all normally solid fission fragments produced during said fission.

16. A microporous contact material for carrying out chemical reactions during and in the presence of nuclear fission of fissionable material, wherein the energy of heavy fission fragments from said fission is transferred to said contact material whereby active contact sites are created thereon which transfer the energy to fluid chemical reactants in the pores of said contact material, said contact material being made up of particles having a surface area within the range of about 5 to 1,500 square meters per gram and pores of a radius in the range of about 4 to 100 angstroms, said particles having dispersed therein fissionable material of a grain size of less than 6 microns and in sufficient concentration to render said contact material capable of effecting a neutron-multiplying fission reaction in the presence of a suitable neutron flux, said contact material being further characterized in that the size and shape of said particles enable the latter to retain therein substantially all of said normally solid fission fragments.

References Cited by the Examiner

UNITED STATES PATENTS

| | | | |
|---|---|---|---|
| 2,350,330 | 6/1944 | Remy | 204—162 |
| 2,872,396 | 2/1959 | Wilson et al. | |
| 2,905,606 | 9/1959 | Long et al. | 204—193.2 |
| 2,905,610 | 9/1959 | Wigner | 176—39 X |
| 2,914,452 | 11/1959 | Shutze et al. | 176—39 X |
| 2,928,780 | 3/1960 | Harteck et al. | 176—10 |
| 2,939,803 | 6/1960 | Steele. | |
| 2,958,637 | 11/1960 | Voorhees | 176—39 |
| 3,065,159 | 11/1962 | Connor et al. | 176—14 |
| 3,085,057 | 4/1963 | Ogorzaly | 176—39 |

FOREIGN PATENTS

| | | |
|---|---|---|
| 583,465 | 9/1959 | Canada. |
| 708,901 | 5/1954 | Great Britain. |
| 785,611 | 10/1957 | Great Britain. |
| 821,297 | 10/1959 | Great Britain. |

OTHER REFERENCES

Coekelbergs et al., Proc. of the Second U.N. International Conference on the Peaceful Uses of Atomic Energy, Geneva, 1958. vol. 29, pp. 428–432.

REUBEN EPSTEIN, *Primary Examiner.*

CARL D. QUARFORTH, LEON D. ROSDOL, ROGER L. CAMPBELL, *Examiners.*